US010044922B1

(12) United States Patent
Bradski et al.

(10) Patent No.: US 10,044,922 B1
(45) Date of Patent: Aug. 7, 2018

(54) HARDWARE SYSTEM FOR INVERSE GRAPHICS CAPTURE

(71) Applicant: Arraiy, Inc., Palo Alto, CA (US)

(72) Inventors: Gary Bradski, Palo Alto, CA (US); Moshe Benezra, Jersey City, NJ (US); Daniel A. Aden, Redwood City, CA (US); Ethan Rublee, Mountain View, CA (US)

(73) Assignee: Arraiy, Inc., Palo Alto, CA (US)

( * ) Notice: Subject to any disclaimer, the term of this patent is extended or adjusted under 35 U.S.C. 154(b) by 4 days.

(21) Appl. No.: 15/643,375

(22) Filed: Jul. 6, 2017

(51) Int. Cl.
*H04N 5/247* (2006.01)
*H04N 5/33* (2006.01)
*H04N 5/232* (2006.01)
*H04N 5/225* (2006.01)

(52) U.S. Cl.
CPC ....... *H04N 5/23203* (2013.01); *H04N 5/2252* (2013.01); *H04N 5/2256* (2013.01); *H04N 5/23238* (2013.01); *H04N 5/247* (2013.01); *H04N 5/33* (2013.01)

(58) Field of Classification Search
CPC ............. H04N 13/0242; H04N 5/2253; H04N 13/0055; H04N 7/10
USPC ........................................................ 348/38
See application file for complete search history.

(56) References Cited

U.S. PATENT DOCUMENTS

| 5,808,350 | A | 9/1998 | Jack | |
|---|---|---|---|---|
| 7,239,345 | B1* | 7/2007 | Rogina | ................ H04N 5/2251 348/159 |
| 2003/0076413 | A1 | 4/2003 | Kanade | |
| 2004/0071367 | A1 | 4/2004 | Irani | |
| 2006/0133695 | A1 | 6/2006 | Obinata | |
| 2009/0123144 | A1 | 5/2009 | Maezono | |
| 2012/0257875 | A1 | 10/2012 | Sharpe | |
| 2012/0314089 | A1* | 12/2012 | Chang | .................... H04N 5/247 348/194 |

(Continued)

FOREIGN PATENT DOCUMENTS

| WO | 2009151903 A2 | 12/2009 |
|---|---|---|
| WO | 2017009324 A1 | 1/2017 |

OTHER PUBLICATIONS

A. Kubota, et al., Multiview Imaging and 3DTV, IEEE Signal Processing Magazine, Nov. 2007, pp. 10-21.

(Continued)

*Primary Examiner* — Tung Vo
*Assistant Examiner* — Zaihan Jiang
(74) *Attorney, Agent, or Firm* — Daylight Law, P.C.

(57) ABSTRACT

This disclosure is directed to a hardware system for inverse graphics capture. An inverse graphics capture system (IGCS) captures data regarding a physical space that can be used to generate a photorealistic graphical model of that physical space. In certain approaches, the system includes hardware and accompanying software used to create a photorealistic six degree of freedom (6DOF) graphical model of the physical space. In certain approaches, the system includes hardware and accompanying software used for projection mapping onto the physical space. In certain approaches, the model produced by the IGCS is built using data regarding the geometry, lighting, surfaces, and environment of the physical space. In certain approaches, the model produced by the IGCS is both photorealistic and fully modifiable.

22 Claims, 13 Drawing Sheets

(56) References Cited

U.S. PATENT DOCUMENTS

| | | | |
|---|---|---|---|
| 2013/0170553 A1* | 7/2013 | Chen | H04N 19/52 375/240.16 |
| 2014/0132722 A1 | 5/2014 | Martinez Bauza | |
| 2014/0267631 A1 | 9/2014 | Powers | |
| 2015/0178988 A1* | 6/2015 | Montserrat Mora | G06T 13/40 345/420 |
| 2016/0142655 A1 | 5/2016 | Macmillan | |
| 2016/0223724 A1 | 8/2016 | Hudman | |
| 2017/0054968 A1 | 2/2017 | Woodman | |
| 2017/0078647 A1* | 3/2017 | Van Hoff | H04N 13/0242 |

OTHER PUBLICATIONS

B. Wilburn, et al., High Performance Imaging Using Large Camera Arrays, ACM Transactions on Graphics, Jul. 2005, vol. 24, No. 3, pp. 765-776.

C. Kuster, et al., FreeCam: A Hybrid Camera System for Interactive Free-Viewpoint Video, Eurographics Association Proceedings of Vision, Modeling, and Visualization, Oct. 4-6, 2011, pp. 17-24.

Edgertronic GentLock Summary, available at http://wiki.edgertronic.com/index.php/Genlock, Accessed on: Jun. 16, 2017.

J. Carranza, et al., Free-Viewpoint Video of Human Actors, ACM Transactions on Graphics, Jul. 2003, vol. 22, No. 3, pp. 569-577.

J. Yang, et al., A Real-Time Distributed Light Field Camera, 13th Eurographics Workshop on Rendering, Jun. 26-28, 2002.

P. Furgale, et al., Unified Temporal and Spatial Calibration for Multi-Sensor Systems, 2013 IEEE/RSJ International Conference on Intelligent Robots and Systems, Nov. 3-7, 2013, pp. 1280-1286.

W. Matusik, et al., 3D TV: A Scalable System for Real-Time Acquisition, Transmission, and Autostereoscopic Display of Dynamic Scenes, ACM Transactions on Graphics, Aug. 8-12, 2004, vol. 23, No. 3, pp. 814-824.

* cited by examiner

FIG. 6
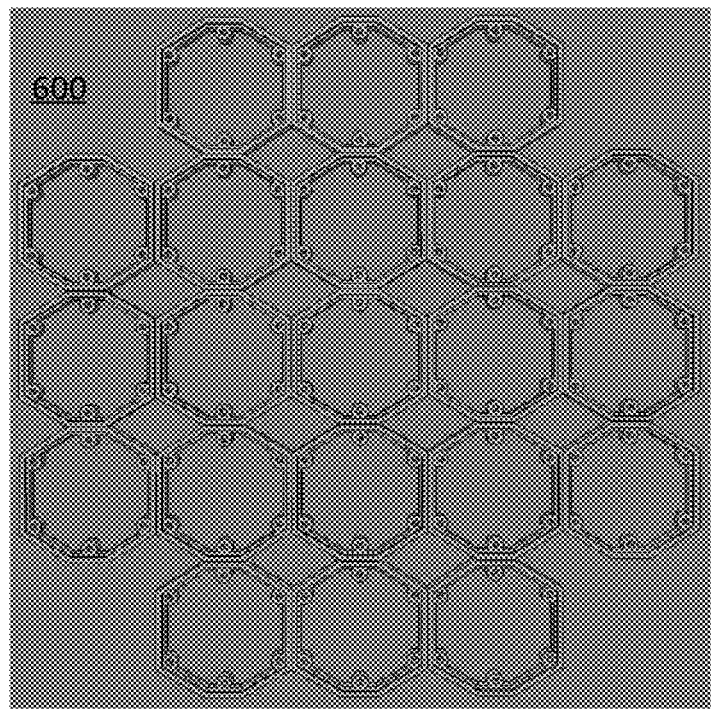
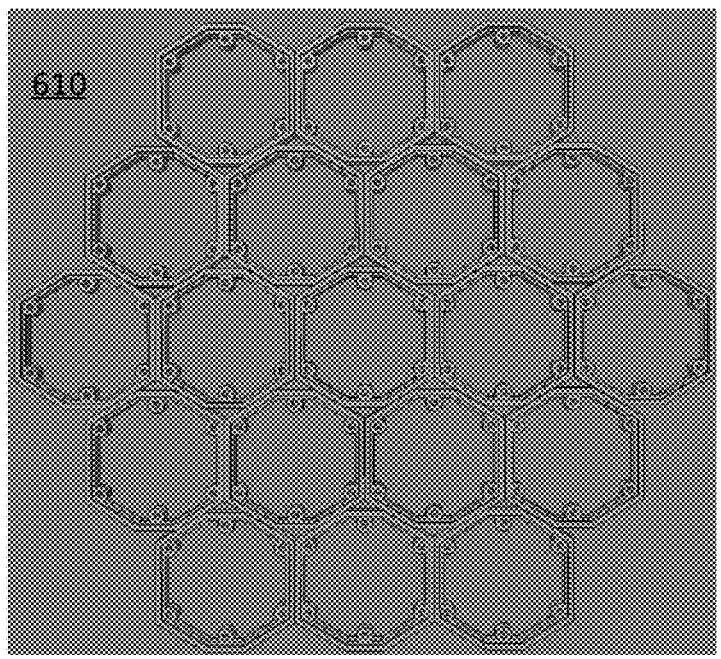

900

1200

HARDWARE SYSTEM FOR INVERSE GRAPHICS CAPTURE

BACKGROUND

Aspects of this disclosure relate to varying technical fields including electronic cinematography, motion and geometry capture for computer graphics and gesture recognition, three-dimensional image-based environment mapping, virtual reality, and augmented reality. However, none of these fields can be said to encompass the entirety of the disclosed systems and methods. The common thread of these variant disciplines is that they require, at least to a certain degree, a system for capturing electromagnetic data regarding the geometry of, and possibly the appearance of, a physical space, and optionally data regarding a scene that plays out within that physical space. As used herein, the term physical space includes actors and movable items within a locale, and is not meant to be limited to a locale as defined by the fixed items therein. Furthermore, as used herein, the movement or other action by those actors or movable items within the physical space may define the scene.

Tools that have been used for the purpose of capturing data regarding a physical space, and scene within that space, include various sensors, such as high definition video cameras or arrays thereof, that are used to obtain digital information regarding a given environment. For example, free viewpoint video capture systems utilize an array of cameras to create a navigable model of a captured scene, so that the scene can be viewed from any angle once it has been captured. The data capture is also sometimes aided via the introduction of fiducials to the environment that are used by computer vision algorithms to model the geometry of a physical space or the movement of items within it.

SUMMARY

This disclosure is directed to a hardware system for inverse graphics capture. An inverse graphics capture system (IGCS) captures video and data of a physical space that can be used to generate a photorealistic graphical model of that physical space. In certain approaches, the system includes hardware and accompanying software used to create a photorealistic six degree of freedom (6DOF) graphical model of the physical space. A 6DOF model is one that allows for the generation of images of the physical space with 6DOF camera pose flexibility, meaning images of the physical space can be generated from a perspective set by any coordinate in three-dimensional space: (x, y, z), and any camera orientation set by three factors that determine the orientation of the camera: pan, tilt, and yaw. The model may additionally include information concerning temporal changes within the physical space. In such situations, the model can be referred to as a graphical model of a scene, and the flexibility provided by the model includes an additional degree of freedom in that a specific 6DOF camera pose can render multiple images as the scene plays out (i.e., time becomes an additional degree of freedom available to those utilizing the model).

An IGCS model can be both fully modifiable and photorealistic. In certain approaches, the model is photorealistic because information concerning the geometry, lighting, environment, and surfaces of the physical space or scene are all captured for later use. Since the lighting, environment, and surfaces are captured, elements can be virtually added or removed from the model without affecting the photorealism produced by the overall model—any change in lighting caused by the virtual removal or addition of elements can be automatically rendered. In certain approaches, the generated model is also semantic in that it contains information concerning the meaning of items in the physical space or scene. (e.g., it includes data identifying a door as a door, or identify the physical pose of a human located in the scene). In these approaches, the resulting model is then effectively a three-dimensional graphics model of the captured scene sufficient to render a cinematographic quality video that is both fully modifiable and photorealistic.

The approaches disclosed herein exhibit numerous benefits and applications. Certain approaches disclosed herein are efficient means for capturing a scene that exhibit the benefits of traditional free viewpoint video captures. For example, there is no need to limit camera angles to prevent capturing another camera, as a camera can be added in to the scene virtually. However, certain approaches provide additional benefits not available in traditional free viewpoint video captures. Approaches disclosed herein allow artists working with traditional video capture media to have an unlimited ability to change the camera pose, lighting, or content of a captured scene during post processing. In a basic example, a director could choose to relight a scene to add a desired effect. Furthermore, the system can allow for a near effortless digital removal or addition of real or virtual elements into or out of a captured scene. In approaches in which the inverse graphics model includes environment or surface information, any modification made to the scene will blend seamlessly with the native elements of that scene because the model of any added elements can be designed to react to the lighting of the model, and the native modeled elements will in turn react to those modifications. The system also allows artists that are developing augmented or virtual reality experiences to use reality as a template for their project without having to design the entire scene from scratch. This aspect of the IGCS is particularly useful for allowing creators accustomed to working with tangible scenes to transition into working with augmented and virtual reality. Furthermore, some of the approaches disclosed herein are capable of generating the graphical model in real time such that it can be used to inform the projection of light onto the physical space and scene itself to modify its appearance to a human observer that is concurrently located in the scene.

In accordance with the diverse set of creators that the hardware capture system is directed to, there are numerous implementations of the system that can suit different applications and skill sets. Some of the approaches disclosed herein are focused on traditional cinematographic capture equipment. For example, certain approaches disclosed herein are directed towards augmenting a system that is based around a cinematographic hero camera. Hero cameras are high-end cameras on the order of $40 k to $100 k that record the primary viewpoint that people see in a traditional movie. However, other approaches disclosed herein are fully functional IGCSs in their own right that do not rely on traditional cinematographic equipment. Indeed, it is a benefit of some of these approaches disclosed herein that the hardware capture system does not rely on the hero camera and can capture similar or superior quality video without such expensive equipment.

FIG. 1 illustrates an example IGCS 100. The individual elements of the IGCS will be discussed individually in the detailed description below. The system includes a synchronization box 101 which synchronizes a set of sensors and optional projectors to align them with the timing of a single element in the IGCS. The sensors can be used to obtain data regarding the geometry, lighting, environment, and surfaces of the physical space or scene. The projectors can be used to introduce information to the physical space or scene. A basic example of a projector is a controlled light source used to introduce basic white light to certain regions of a scene. More complex projectors allow for the introduction of information that alters the apparent geometries and surfaces to the scene. Information can also be introduced by the projectors in the form of codes or patterns that are used by sensors in the IGCS to assist with sensor calibration, geometry capture, and sensor pose determination. The light produced by the projectors can be in visible light, IR light, or light of any spectrum.

The projectors in the IGCS can include projectors that generate light for projection onto the physical space based on the detected characteristics of the physical space. For example, a projector can be used to provide a different background to a scene or alter the surface of a specific item in the scene. The projectors can be fixed or mobile devices that are capable of projection mapping images onto the physical space or scene. The projectors could be tracked using on-board sensors that keep track of their locations, or by being augmented with active or passive fiducials that can be detected by other elements of the IGCS. The projector could be synchronized with the other elements of the IGCS. A control system could pair real time knowledge of the model generated by the IGCS to assist in the projection of a 3D surface back onto the physical space or scene. The surface would then appear as desired to observers physically located in the physical space to create visual effects for those observers without the need for AR or VR headsets. As illustrated, IGCS 100 includes a projector 102 that is projecting a pattern of light required to generate a visible photorealistic image of a brick wall 103 within the physical space. The light generated by the projector 102 could be calibrated based on information concerning the surface that the light is being projected onto and information concerning the location of projector 102 within the IGCS. This data could be obtained by on-board sensors, or by other independent sensors in the IGCS that provide their data to the projector.

The sensors in the IGCS can include a traditional hero camera as well as additional sensors in the form of pods 104, 105, and 106. The pods are densely tiled arrays of sensors used to capture the geometry, lighting, and environment of the scene. The pods can be connected to the hero camera, such as pod 104, or be positioned independently such as pods 103 and 104. In the specific case illustrated, pod 106 is configured for a three-dimensional capture and is mounted to a specialized three-dimensional hero camera 107. Additional pods can be specialized for specific purposes. For example, specialized pods such as light capture pod 108 can be configured to capture the location and properties of directed light within a physical space as well as determining the ambient lighting and the environment of a scene. As illustrated, light detection pod 108 can determine the location and characteristics of light source 109 which can be beneficially integrated into the model of the physical space. Light detection pod 108 could be equipped with a wide-angle field of view camera and include spectral or polarized filters that can be varied to obtain information about the environment.

The IGCS can also include a surface scanner 110. The surface scanner is included in close proximity to the other elements of IGCS 100 for purposes of illustration, but surface scanner 110 will likely be located in a separate lab from the rest of the equipment. However, other surface scanners that will be described below are meant to be used on set with the rest of the equipment in the IGCS. The surface scanner can be a specialized rig of moving lights and cameras used to capture the lighting response of a given surface. The surface scanner can be configured to obtain surface properties such as the bidirectional reflectance distribution function "BRDF" of the surface. The obtained information will allow the surface to be rendered under variant lighting conditions and from multiple angles in a photorealistic fashion. This is done because capturing just one view of a surface and using the obtained information to render it from a different viewpoint yields a "synthetic" look to a scene. The surface scanner 110 is drawn on the periphery of the illustration to note that the surface scanner 110 does not necessarily need to be located within a physical space during capture, as in some applications the surface information it obtains can be stored separately from information concerning the environment, lighting, and geometry of a physical space.

The IGCS can also include localized data storage systems. In some situations, the IGCS will generate and need to store massive amounts of data that would be too cumbersome to transmit off site through a network connection. Therefore, the IGCS could include data cases used for static storage of data in a compact, shock resistant, shippable form that is easy to carry to and from a physical space in which a scene will be captured. The data cases could also be directly shippable via a standard courier service to offline cloud storage data centers. The elements of the IGCS could include wired or wireless LAN network connections to allow the data to be collected in one or more of these centralized cases. The data from the myriad sensors could be stored in a coherent fashion with the assistance of a central synchronization system. As illustrated, IGCS 100 include a data case 111 that is physically separate from the synchronization box 101. However, both functional elements could be integrated into the same physical unit.

BRIEF DESCRIPTION OF THE DRAWINGS

FIG. 6 is an illustration of two pod array frames in accordance with certain approaches in this disclosure.

DETAILED DESCRIPTION

Figure 1:
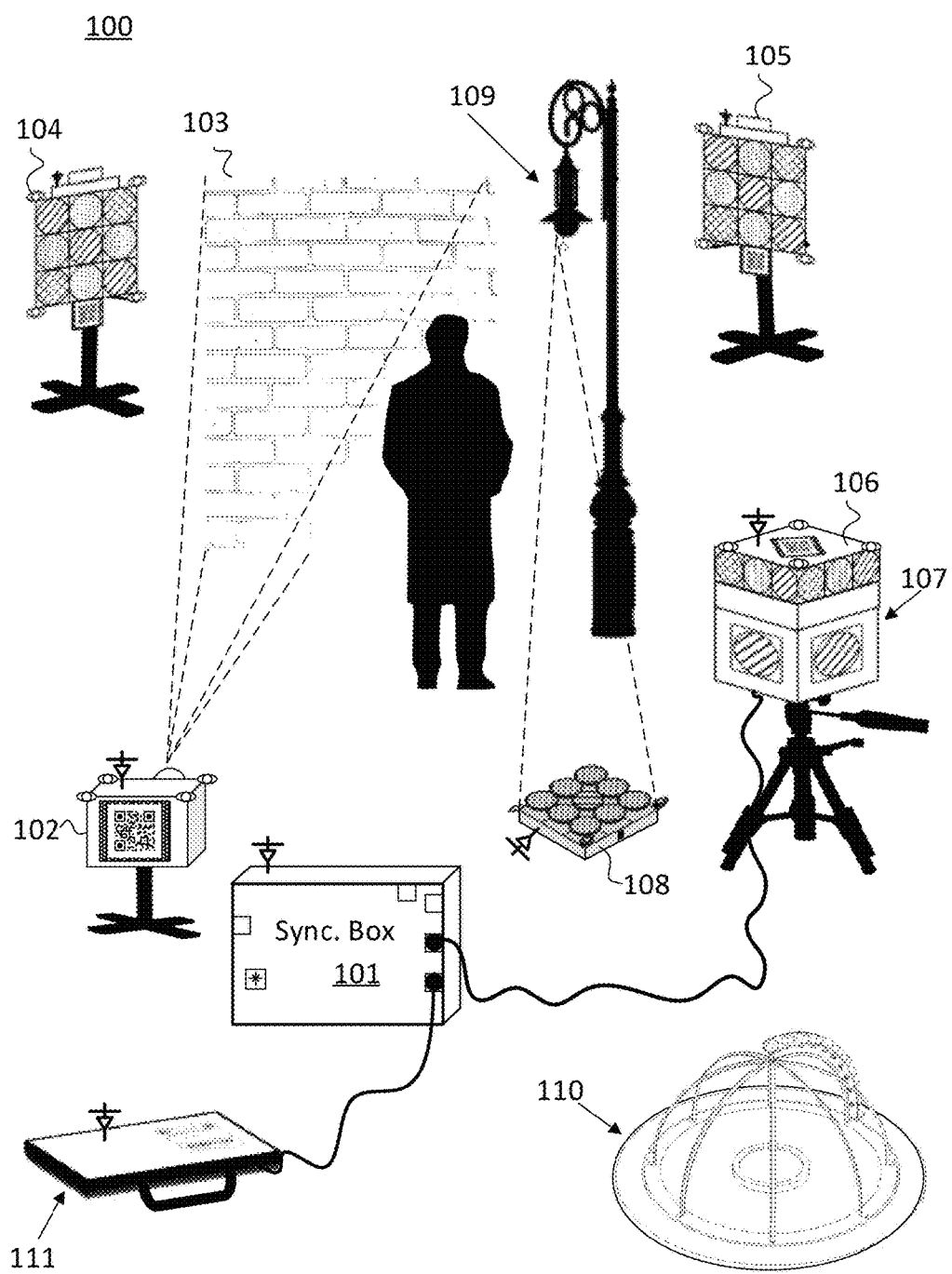
FIG. 1 is a block diagram of various elements of an inverse graphics capture system (IGCS) in accordance with certain approaches in this disclosure.

The elements of FIG. 1 provide a framework for the following detailed description of various inverse graphics capture systems (IGCSs). Although the elements of FIG. 1 are designed to work in combination, it should be clear from the following disclosure that an IGCS does not require every element of FIG. 1. An IGCS captures data of a physical space that can be used to generate a photorealistic graphical model of that physical space. The graphical model can be stored for later processing, such as for the addition of virtual elements and rendering of augmented photorealistic aspect of the space, or it can be utilized in real time, such as for the addition of photorealistic surfaces onto the physical space.

The IGCS can include myriad cameras and other sensors. In some approaches, the data collected from the sensors will be synchronized during post processing after the data has been captured. For example, each of the sensors could be augmented with the ability to add a time stamp to their collected data. The time stamps could then be used in post processing to formulate a coherent description of the physical space or scene at any given time. However, in other approaches, the actual capture process is synchronized such that the data from each moment of the scene as obtained from the various sensors already forms a coherent description of a single moment in the scene when it is collected. In certain approaches, the cameras involved with a capture will comprise a homogeneous collection of sensors. However, in other approaches, the cameras and sensors involved will not comprise a homogenous collection of sensors such as the uniform camera arrays used for traditional free viewpoint video capture systems. As such, a single precise trigger signal sent from a central control system will not result in a coherent capture. This is because, due to the heterogenous collection of sensors that can be used in an IGCS, each sensor will have its own unique intrinsic delay between when the trigger signal is received, and when the actual capture of data occurs. Although slight mismatches may be acceptable for less strenuous applications, the precision required for inverse graphics capture is quite precise. Without extensive post production effort, capture precision must be roughly within 1 microsecond. For example, the industry standard GenLock signal used to synchronize the operation of multiple devices associated with the production and capture of a live event will not produce the level of precision required for an IGCS using a set of heterogenous sensors.

Figure 2:
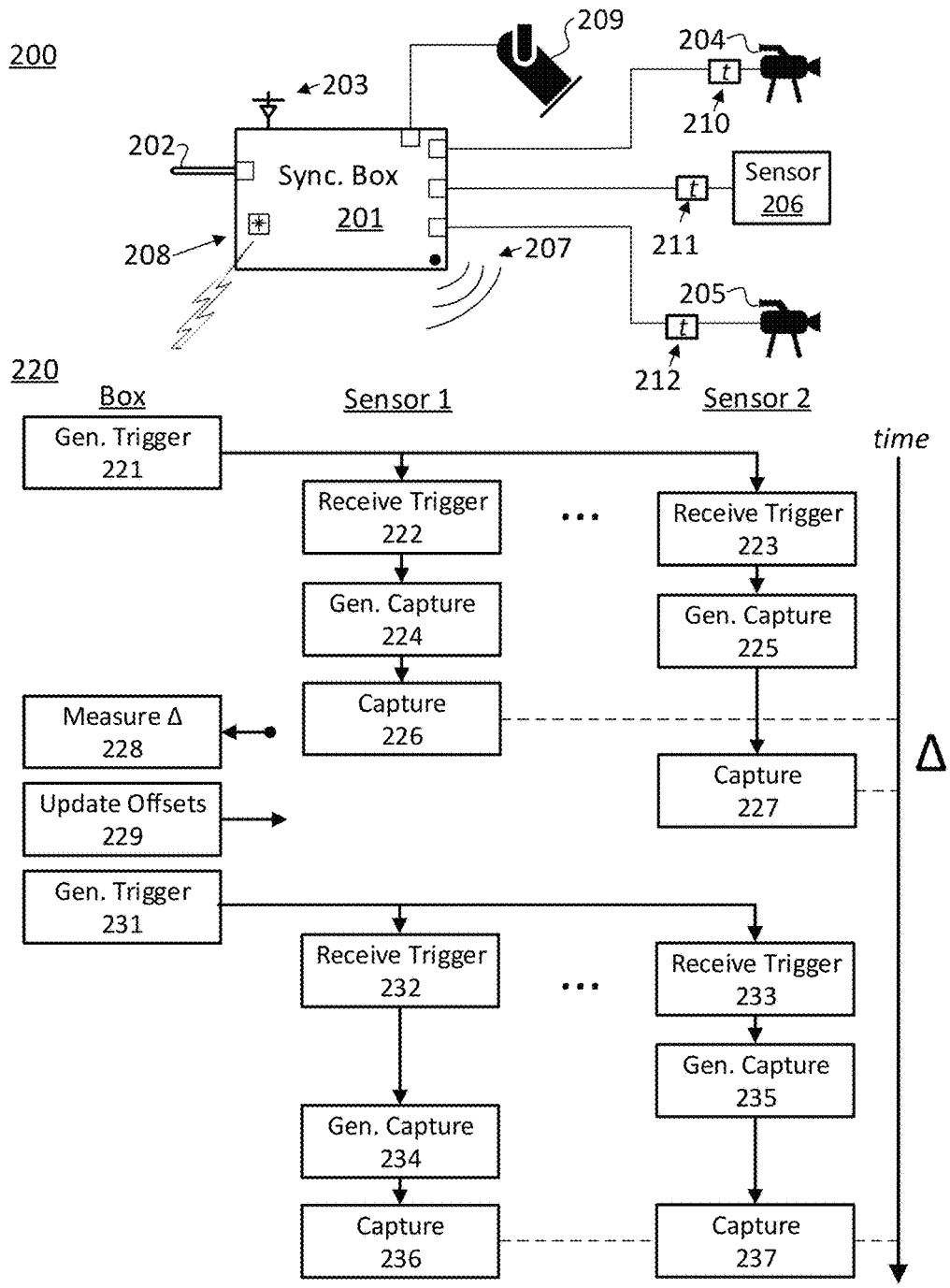
FIG. 2 is a block diagram and flow chart for a synchronization box for an IGCS in accordance with certain approaches in this disclosure.

FIG. 2 includes block diagram 200 and flow chart 220 illustrating the operation of a synchronization box 201 for an IGCS. The synchronization box used for an IGCS can generate a trigger signal as in step 221. The synchronization signal can be generated by a synchronization board located in the synchronization box. The board can be a printed circuit board (PCB). The trigger signal can be a GenLock signal. The synchronization box may have a line-in jack 202 which will allow it to receive a trigger signal from another synchronization box, hero camera, or some other element in the IGCS. The trigger signal could also be received wirelessly such as via an antenna 203. Alternatively, the synchronization box may generate its own trigger signal using internal logic and a timing source such as a crystal or piezoelectric device. The logic and timing source could be located on a synchronization board such as a PCB. Although the term synchronization "box" is utilized throughout this disclosure, the actual form factor of the synchronization box is not limited to one that is box-like and rectangular. The synchronization box can take on any form factor used to house a synchronization control system. As mentioned previously, the synchronization box can also be integrated with a data case used to store captured data from the IGCS.

The trigger signal can be used by a set of heterogenous sensors to capture data. The trigger signal will be received by each of those sensors and used to control the execution of a capture in which sensor data is captured and stored. For example, the trigger signal could be used by a camera to control the shutter for obtaining image data. In the illustrated case, synchronization box 201 has a wire connection to a first camera 204, a wire connection to a second camera 205, and a connection to a generic sensor 206. Sensor 206 could be another camera or any of the sensors disclosed elsewhere herein. Synchronization box 201 will use the wire connections to trigger the attached sensors to capture data regarding the scene in question in accordance with the approach outlined by flow chart 220. Since approaches disclosed herein are able to screen out the unique intrinsic delay associated with the sensors, as well as the unique delay associated with the time it takes for the trigger signal to travel from the synchronization source to the sensor, there is no need to assure that the wire connections are equidistant. Given this benefit, the trigger signal could alternatively be sent out wirelessly via a radio out signal 207 with little to no effect on the performance of the system.

The synchronization box can also have light inputs 208 for synchronizing captures with the lighting conditions of a scene. Such approaches would be useful for situations in which the ambient or directed lighting in the physical space was operating at a frequency that could interfere with the sensors in the IGCS. The lighting inputs can be standard wire inputs receiving control signals from the system controlling the lights. Alternatively, the light inputs 208 could be actual light sensors that physically detected the light and the lighting frequency. The synchronization box would then use the obtained information when sending out control signals to control the sensors.

In flow chart 220, steps 221-237 are plotted against time, and are broken into columns to indicate steps that are conducted by synchronization box 201, a first sensor, and a second sensor. The flow chart also includes an ellipse to indicate the fact that the trigger signal generated in step 221 can be delivered to any number of heterogenous sensors in an IGCS. The approach of flow chart 220 is broadly applicable to any set of heterogenous sensors in an IGCS including cameras, light sensors, and motion sensors. The sensors can be obtaining information regarding the physical space and scene, or could be obtaining information concerning the cameras and other sensors in the IGCS. For example, the sensor could be a camera obtaining information concerning the geometry of the scene, or the sensor could be an IMU obtaining information concerning the location or position of that camera in the scene at the time a capture is executed. Furthermore, the approach of flow chart 220 is broadly applicable to any set of devices used in an IGCS including devices that add information to the scene or physical space such as projectors 209 that need to be synchronized with the overall system.

Each heterogenous sensor could be augmented with a calibration board that receives the trigger signal from the synchronization box and generates a capture signal by adding a temporal offset to the trigger signal. The calibration boards are illustrated in block diagram 200 as blocks 210, 211, and 212. Steps 222 and 223 could involve calibration board 210 receiving the trigger signal from synchronization box 201, and calibration board 211 receiving the trigger signal from synchronization box 201. As illustrated, there may be a slight offset between steps 222 and 223 owing to the different travel times between the synchronization box and the two calibration boards. After the trigger signal is received at the calibration boards, the calibration boards will generate first and second capture signals in steps 224 and 225. The capture signals could be generated in response to the receipt of the trigger signal in steps 222 and 223. The capture signal could instruct a sensor connected to the calibration board to capture data. The calibration boards could generate the first and second capture signals by adding a first temporal offset to the trigger signal and a second temporal offset to the trigger signal. In the case of steps 224 and 225, the temporal offset is zero and the IGCS has not yet been calibrated. As a result, the actual capture conducted by the first sensor in step 226 and the second sensor in step 227 are not conducted simultaneously and there is a difference Δ between when the data is collected by the two sensors. For the purpose of this illustration, the instantaneous moment identified on the time line by the capture steps is the point at which the sensor's analog systems begin to accept data. For the specific example of a camera, the capture point is set by the point at which the camera beings to capture a first frame of a scene. In either case, the collection of data can be referred to as describing a frame of the scene and the capture can be referred to as a frame capture.

The difference between when the data is collected by the various sensors is caused by the intrinsic delay of the sensor, as illustrated by the different spacing between steps 224 and 226, and steps 225 and 227, and the different flight times of the trigger signal from the synchronization box to the sensors, as illustrated by the different spacing between trigger 221 and steps 222 and 223. The sensors in the IGCS could each be associated with a different offset from a mean capture time. Aligning these captures is conducted by the synchronization board operating in combination with the calibration boards of each sensor. Once all of the captures are aligned, the IGCS will produce data that accurately describes a single frame of the scene. Using approaches disclosed herein, the capture points can be aligned to within less than 1 microsecond. For example, an IGCS utilizing approaches disclosed herein can have all capture points aligned to within 40 nanoseconds.

In step 228, the difference between the first time, at which the first sensor captured data in step 226, and the second time, at which the second sensor capture data in step 227, is measured. The difference can be measured in numerous ways. However, the measurement can be conducted in combination with a calibration system such as that discussed with reference to FIG. 3. The calibration boards for sensors that do not capture visible light can be augmented to capture visible light at the same time the sensors actual data capture occurs in order to provide a channel for synchronizing the sensor with the overall system. The measurement can also be obtained by a control line back to the synchronization box directly from the calibration board or sensors such as via a basic ethernet connection or other communications connection. The measurement can be conducted by the synchronization box itself or with another system.

Regardless of how the difference signal is obtained, the measured difference, or differences, in the capture times is then used to update the offsets used by the calibration boards in step 229. The update can be generated to cancel out the measured difference using any form of feedback control. For example, if step 228 generated an estimate that the first camera was capturing data 10 us before the second camera, a 10 us delay could be sent to calibration board 210. However, if step 228 simply generated an indication that the difference was positive or negative, a stepwise delay correction signal could be sent to calibration board 210 or 211 based on the obtained information. Finally, the synchronization board could simply provide basic information concerning the difference to the calibration board, and the calibration board could generate the actual amount of the temporal offset utilized to implement that instruction. The update can be sent to the calibration boards using the same channel as the trigger signal itself. For example, the same wired or wireless connection could be used to transfer both the delay update and the trigger signal from the synchronization box to the calibration board.

In the illustrated case, the control loop is able to select the appropriate offset immediately in one iteration of step 229. As a result, the next time the synchronization box sends out a trigger signal, as in step 231, the trigger is again received by the synchronization boards in steps 232 and 233. However, synchronization board 210 will add a different temporal offset to the trigger signal before generating a capture signal in step 234. As a result, and as illustrated by the flow chart, the actual capture 236 is now temporally aligned with capture 237 as resulting from step 235.

Synchronization box 201 is able to synchronize all of the sensors to which it is attached by altering the temporal offsets added by its constituent calibration boards to minimize a difference between the actual capture times of its constituent sensors. A single synchronization box could thereby synchronize all of the sensors in an IGCS. However, a single IGCS could include multiple synchronization boxes that are themselves synchronized via a higher-level synchronization box. Since the synchronization box and calibration boards are arranged in a master-servant relationship, the same structure can be repeated to any degree by adding an additional supervisory master level. In certain approaches, each pod in the IGCS will include its own synchronization box to synchronize all of the sensors on that pod to a common source.

The synchronization system described with reference to FIG. 2 can be applied to numerous IGCS variations. For example, a set of heterogenous witness cameras could be synchronized with a trigger signal generated by a hero camera and delivered to a synchronization box in order to augment an existing hero camera with IGCS capabilities. Although the example of sensors was utilized to illustrate the behavior of the synchronization box 201, the trigger signal can also be used to control the timed generation of signals that are added to the captured scene such as visible light sources, image projectors, code and pattern projectors, non-visible light fiducials, and any other added signals that need to be synchronized with the IGCS. In short, the trigger signal and associated approach is broad enough to facilitate synchronization of either a capture of, or the introduction of, information to the scene. Indeed, in some approaches the main synchronization signal can be generated by a projector or other device used to introduce information to the scene.

In fact, any piece of existing equipment that is capable of generating a synchronization signal or serving as the generator for a GenLock system can be used as the master synchronization source for the IGCS in accordance with this disclosure by providing that synchronization signal to the synchronization box.

The synchronization box can be used to produce and synchronize other control signals In these implementations, the calibration boards can be integrated with a control board for controlling the overall operation of the associated sensor or projector in the IGCS, and receiving control signals from the synchronization box. The control signals could include commands such as start capture, stop capture, adjust frame rate, adjust shutter speed etc. in the case of cameras, or start projection, change projected image, or stop projection in the case of projectors. In the case of texture, pattern, and code projectors, the synchronization box could control when the light generators should turn on and the characteristics of their generated light. The synchronization box may also control gain, white or gray balance, light detection and ranging (LIDAR) sweeps, online calibration, and active tracking of devices in the IGCS. Generally, the centralized synchronization and control system can also allow the IGCS to perform various computer vision algorithms such as those associated with depth per pixel, segmentation masks, tracking, SLAM, and lighting and feature detection.

The ability of the synchronization system to align the elements of an IGCS to a common time frame does not necessarily mean that all of the elements will be capturing or producing information at the same time. In some approaches, it is desirable to purposefully introduce an offset to the various sensors or projectors. For example, the IGCS may be set to instruct sensors to capture at different offsets in a form of phased capture which can be used to generate information that is stitched together in post processing such as for HDR. As another example, the different offsets can be used to increase the effective frame rate of the overall capture. The various cameras on a given pod could be temporally offset to produce information that can be either treated as multiple views of the same frame, or fragmented at a later time to increase the effective frame rate of the associated capture. The synchronization system can facilitate such processes by intentionally introducing offset to various sensors or subsets of sensors in the IGCS. The synchronization box may also send out controls such as distribute shutter times for high dynamic range, or distribute capture times among grids of cameras to get the equivalent for high temporal capture rate.

The various elements in the IGCS and their calibration or control boards can be identified by unique identifiers for commands to be delivered to the appropriate device. However, the control system can also be configured such that each unique element has an assigned communication channel with the synchronization box such that the controller only needs to determine which channel to send information along in order for the control signal to reach the appropriate element.

The control loop for synchronizing the IGCS and setting the temporal offsets of the various sensors can utilize a synchronization array. The synchronization array can be an array of eight or more LEDs arranged in columns that cycles through a coded pattern of active and dormant LEDs. The array can include sets of LEDs that cycle between active and dormant states at different frequencies. The array can exhibit various codes based on which LEDs are active and which are dormant. A comparison of two of those codes could provide a unique value for a temporal offset. For example, the array could include sets of LEDs. The set can be designed so that each LED in the set operates at a common frequency, has a duty cycle equal to one over the number of LEDs in the set, and is the only LED in the set active at any given time. The different sets can operate at frequencies that are factors of the frequency of another set. The slowest set of the calibration array would then set the largest offset that could be identified uniquely while the fastest set would set the precision with which the offset could be identified. An illustration of this concept is provided in FIG. 3.

Figure 3:
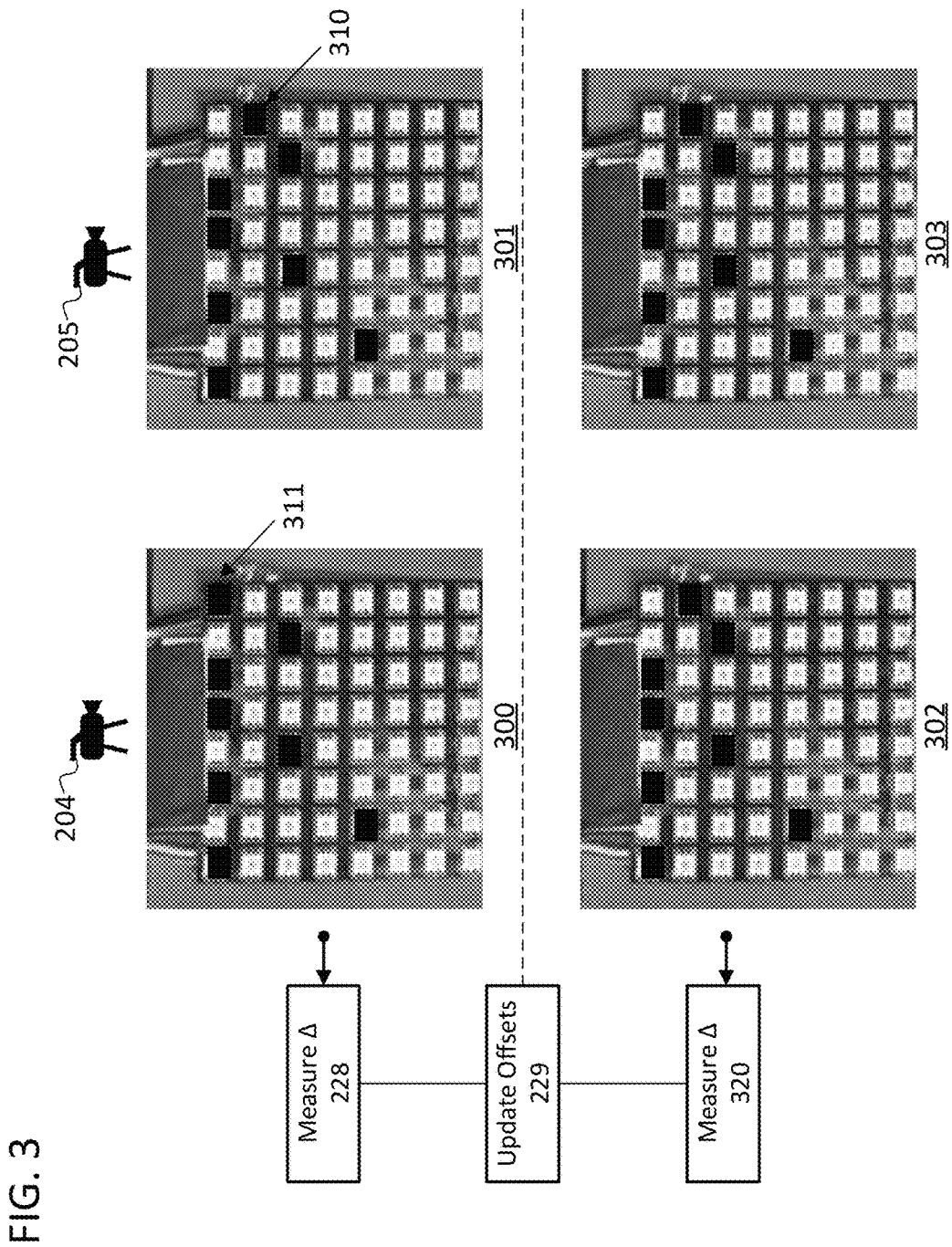
FIG. 3 is a flow chart and illustration of the operation of a calibration board for a synchronization system in accordance with certain approaches in this disclosure.

FIG. 3 provides an illustration of an LED array of 64 LEDs as taken by two sensors before and after calibration. Active LEDs are illustrated by black rectangles for clarity. There are four different states illustrated. State 300 shows the array as captured by a first sensor prior to calibration. State 301 shows the array as captured by a second sensor prior to calibration. States 302 shows the array as captured by the first sensor after calibration. State 303 shows the array as captured by the second sensor after calibration. The sensors could be cameras 204 and 205 from FIG. 2. The cameras could be directed to take images of the same calibration array. The IGCS could conduct step 228 by determining the code exhibited by the array in state 301 and 300 and determining a unique value for a temporal offset. The temporal offset could then be applied to one of cameras 204 and 205 in step 229.

In the illustrated case, codes are expressed by the array by only having a single LED turned on in a column at a given time. The LEDs in each column turn on one after the other in a pattern descending from the top to the bottom. Each column of the array operates at a different frequency to increase the utility of the array for trimming form high to low resolution. In this example, each column of the array operates at a frequency that is twice as fast as the column to the left. The fastest column is operating at a frequency of 1 microsecond. As seen in a comparison of states 300 and 301, LED 310 is illuminated in state 301 while LED 311 is illuminated in state 300. As a result, the synchronization system will be able to determine in step 228 that the first sensor and second sensor are misaligned by ⅛ of a microsecond. A ⅛ microsecond delay can then be applied to camera 204 in step 229 to counteract for this offset. As a result, when the offset is measured again in step 320, the codes expressed by the two states align, which confirms the calibration has been executed properly.

Although FIG. 3 only illustrates the operation for two sensors, the approach will function to calibrate any number of sensors at a given time because each will detect a code indicative of its own unique offset. If enough LEDs are utilized, a broad range of offsets can be detected and tuned using only a single captured frame. However, the approach can be modified slightly such that the same range of offsets can be adjusted for using a smaller number of LEDs. For example, a coarse correction could be conducted at one frequency of operation, and the frequency could be iteratively increased while obtaining additional calibration frames to calibrate until a desired level of fine calibration was reached.

Numerous variations of the calibration board are possible. Benefits accrue to variation in which the lights are fast LEDs so that the frequency of the light itself is negligible compared to the frequency of the code generation by the board. Benefits also accrue to variations in which the codes distinguish over a large range by having multiple sets of lights flashing in a synchronized and factorized fashion. The number of columns can be expanded beyond 8, and the board itself can comprise multiple arrays. In particular, the board could include two separate 8×8 grids. Furthermore, the calibration board could be designed as a calibration cube, sphere, or other three-dimensional shape which allowed the expressed code to be viewed from multiple angles in a three-dimensional space. A three-dimensional calibration board could express the same code in multiple directions. For example, a cube calibration board could express the same code on each of its faces. Although the example of LEDs was used, any light source that was able to switch between active and dormant quickly and not flicker at a noticeable frequency would be sufficient. In certain approaches, the array would be portable and could be positioned in the physical space or scene at any given location to calibrate for a specific distribution of sensors. Portable calibration boards would be particularly useful in situations in which the offset of various sensors was strongly correlated with the time of flight of the trigger signal from a central synchronization box to the sensors.

The sensors and projectors of the IGCS can be grouped together in densely packed arrays called pods. An example of such a pod is provided in FIG. 4 as pod 400. The pods can be stand-alone devices such as pod 400, or they can be configured to augmented the capabilities of an existing piece of equipment such as in configuration 450 where two pods, 451 and 452, are physically attached to, and augment the capabilities of, a traditional hero camera 453. The pods can be distributed around a physical space or scene in any desired combination of specific locations. The pods can be fixed within the physical space or they can be portable. The pods can include acceptor jacks for traditional tripods. The pods can be attached to rigs that are programmatically controlled to alter the position of the pod during a capture. The pods can be attached to rigs that are physically moved by a human operator during a capture. The pods can communicate with the rest of the IGCS using any combination of wired or wireless communication connections. To this end, the pods can be augmented with control boards 401. The control boards can exhibit the features of the calibration boards discussed with reference to synchronization box 201, and can otherwise communicate with any central control system of the IGCS to control and synchronize the capture or generation of information by the pod.

The pods, and indeed all elements of the IGCS, can be augmented with certain features that allow the IGCS to determine the location and pose of the sensors or projectors in the pod. The features can be active or passive tracking markers, or any form of computer vision that can deduce the location and pose of the various sensors in the IGCS. The obtained information can be used to create a coherent description of the physical space and scene with respect to a unifying frame of reference such as a common coordinate frame. Computer vision techniques can be utilized to locate each element within the IGCS and thereby use each pod's data to provide depth per pixel in the IGCS's geometric framework, matting, segmentation, and tracking. The data from each pod can likewise be used in simultaneous localization and mapping (SLAM) for the IGCS to help automate the modification or enhancement of the captured scene with the addition or removal of virtual elements. The obtained information can also be used to counteract the effect of motion of the pods on a particular capture. The location and pose data can be generated in real time or during post processing. For example, pods 451 and 452 could be used to determine the pose of hero camera 453 in real time during a capture.

The features used for the purposes described in the prior paragraph could include sensors that allow the pod, or other IGCS element, to determine its own location which would then be sent to a controller of the IGCS. For example, the pods could include inertial measurement units (IMUs), such as IMU 402, and could use the IMU to determine its location, and then transmit that information from control board 401 to a central controller. These features could also include visible light cameras, LIDAR, or IR projectors for conducting SLAM. The pods could also include light field cameras for determining pose and position of the pods based on other captured information regarding the location of light sources within the physical space or scene. The pods could also include receivers for indoors positioning systems or global positions systems for this purpose. The features could alternatively or in combination include elements that allow other sensors in the IGCS to determine the location or pose of the pod. These sorts of features can be referred to in this disclosure as fiducials, and they can be either active or passive. The fiducials could also include information concerning the identity or status of the element of the IGCS they were associated with.

The pods and other elements of the IGCS can be augmented with active or passive fiducials of varying styles to obtain information regarding the pose and position of those elements. For example, the pod could include a visual tag that could be detected by another visible light detector in the IGCS. As illustrated, visual tags 403 could be used by a camera in the IGCS with a view of pod 400 to recognize pod 400. If the visual tag was placed on a known location of the pod, the IGCS would then be able to ascertain the position and pose of the pod. As stated previously, the visual tags could include information concerning the identity of the pod. For illustrative purposes, tag 403 includes a QR code, but any machine-readable code could be used for this purpose. As another example, the pod could include lights that could be detected by another light detector in the IGCS. The lights could project infrared, ultraviolet, or visible light for detection by other sensors. As illustrated, pod 400 includes LED pose tags 404 that could be used for this purpose. Synchronization box 201 could be configured to receive this information directly from the pods using a light detector. The lights could be designed to flash in accordance with a specific pattern that could be used to identify one pod from another, or provide other status information. Alternatively or in combination, the lights could project light at a specified spectrum that could be used to identify the pod. In a basic example, the various pods and other elements in an IGCS could have color-coded active fiducials to assist in identifying one element from another as well as identifying the elements location.

The IGCS could also be designed to inherently identify a pod, or other element, based on any combination of deduction or inference using information obtained by the pod itself or other sensors in the system. For example, the IGCS could include machine intelligence capable of identifying the shape and orientation of a pod, and deducing the pose and identity of the sensor or projector based solely on that information. A set of specialized pods or other sensors created specifically for this purpose could be positioned in line of sight with all of the other elements of the IGCS in the physical space.

The pods can be densely packed arrays of any size and configuration and include any combination of synchronized sensors and projectors. The sensors and projectors can be modular and comprise a modular board and base assembly as described in more detail below with respect to FIGS. 5-9. The pods can include a collection of homogenous or heterogenous sensors and projectors and can have any dimension M×N (including N×N). The sensors can be cameras. The sensors can be three-dimensional mapping cameras or light field cameras. The sensors can also include depth sensors such as LIDAR or other means used specifically for detecting the geometry of a specific scene. However, the pods can also be augmented with separate appendages for depth sensors that are separate from the main array of sensors on the pod. The combination of sensors and projectors can be selected to serve specific purposes. For example, specific pods could be designed exclusively for geometry, surfaces, environment, lighting, or color. The projectors can include IR pattern projectors that put out a fixed or active random or structured pattern that other IR sensitive cameras may pick up. The projectors could output codes. The patterns and codes can be used to facilitate the capture of depth information concerning the physical space or scene, or can be used to communicate other information between different pods and cameras in the IGCS. The projectors can output light from any spectrum for this purpose. Specific elements in a pod, or entire specialized pods, can be used to serve as the projectors 102 from FIG. 1. The sensors in an array can be designed to capture all at once, or capture in phases to achieve higher temporal resolution (e.g. faster frame rate). In addition, in the case of an array of cameras, the various cameras might have different shutter rates for higher dynamic range, and could be calibrated in a common coordinate system to have their lenses distortions mathematically removed.

The sensors on the pods can utilize filters to provide their homogeneity (e.g., infrared, ultraviolet, polarized light of a given polarity, portions of the visible light spectrum, etc.). The filters can be permanently attached to the sensor or lens via a coating. The filters can be removably attached to the sensor or lens such that they can be replaced (e.g. a polarizing filter). The filters can also be tunable such that they can be adjusted in-between or during captures without having to manually change the filter. The adjustments can be conducted during a calibration procedure or during a capture.

The pods can include other elements used to support their compliments of sensors and projectors. For example, the pods could include the calibration boards mentioned elsewhere, which could be augmented with additional control capabilities for localized control as an alternative to the centralized command that could be delivered from the central unit. The pods could include logic to switch between a local command and centralized command mode. However, synchronization could be provided centrally in either mode. The pods could also include a local power source and power regulator circuitry. For example, a mobile pod could include a batter pack and switching power regulator. The pods could also include onboard storage to allow them to be easily moved around during a capture without the need to continually transmit large volumes of data. Furthermore, the pods can capture raw data for delivery to other elements of the IGCS, or have on board compute capabilities that process the data before it is offloaded from the pod. The onboard compute capabilities could be achieved by a field programmable gate array (FPGA) or application specific integrated circuit (ASIC) built into the same assembly as the sensors.

Figure 4:
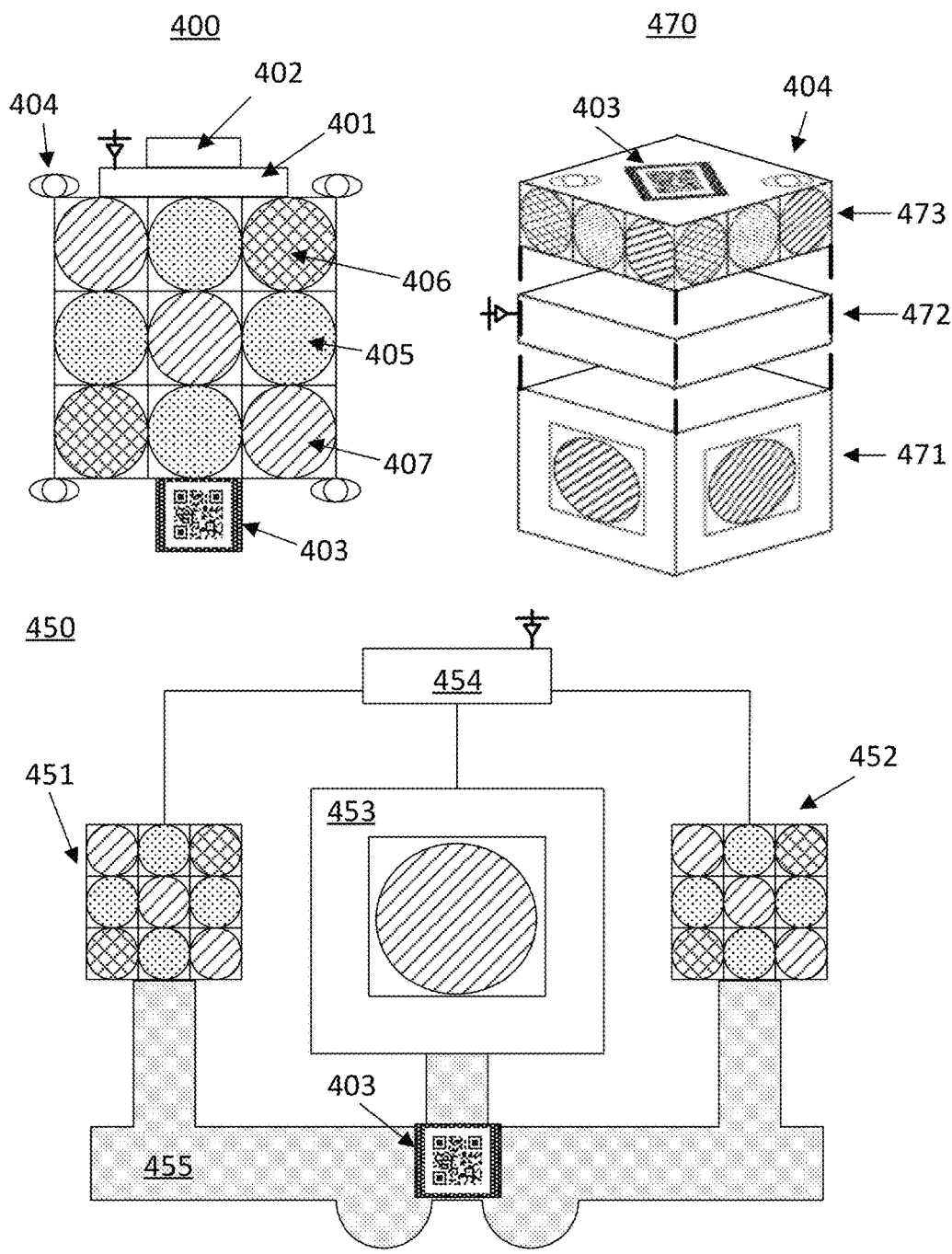
FIG. 4 is a block diagram of a sensor pod, a hero camera and sensor pod assembly, and a three-dimensional hero camera and sensor pod assembly in accordance with certain approaches in this disclosure.

In the examples illustrated in FIG. 4, pod 400 includes a 3×3 array of synchronized sensors and projectors, while assembly 450 includes hero camera 453, and two pods 451 and 452 that each include 3×3 arrays similar to those of pod 400. Pod 400 includes visible light cameras 405, IR light cameras 406, and pattern projectors 407. Pods 451 and 452 are used to augment the capabilities of hero camera 453. The pods and hero camera share a calibration and control board 454 and are all bolted to a rail 455 that allows the angles of the hero camera and pods to be adjusted relative to each other and then fixed for capture. Rail 455 clamps onto hero camera 453 and provides sliding turn-able mounts to hold pods 451 and 452. The pods can therefore be rotated relative to the hero camera and then locked into place. The pods can be set to have a pose parallel with the hero camera or they can be verged and face in towards the pose of the hero camera such that most of their resolution is at the depth where the fields of view verge together. Like the pods generally, the overall rig can be augmented with fiducials such as visual tag 403 or any of the other active or passive fiducials mentioned above.

Pod 400 and assembly 450 are configured to capture in the same general mode as traditional cameras used for two-dimensional image capturing. However, the pods of an IGCS can be designed to capture in multiple dimensions at once. Like their two-dimensional counterparts, the multiple dimension pods can be portable or fixed such as by being mounted to a tripod. They can also be attached to a rig that programmatically adjusts their pose or position through the course of a scene. Also, like their two-dimensional counterparts, the multiple dimension pods can also be stand-alone devices or used to augment the capability of a hero camera. However, in the case of a multiple dimension pod the hero camera will beneficially also be multi-dimensional such as a specialized three-dimensional hero camera. The pod and hero camera can also still be synchronized with a common calibration and control box to provide control signals, depth per pixel, segmentation masks, tracking, SLAM, lighting and feature detection.

Assembly 470 is an example of a three-dimensional hero camera being augmented by a three-dimensional pod. Assembly 470 includes a three-dimensional hero camera 471 that has four wide angle lenses facing off from four opposing faces of a cube, a three-dimensional sensor pod 473 having arrays of sensors on the same corresponding faces of a cuboid, and a calibration and control box 472 that is common to both the three-dimensional sensor pod 473 and the three-dimensional hero camera 471. In this configuration sensor pod 473 could be configured as a depth sensor located on top of hero camera 471 and exclusively concerned with capturing data regarding the geometry of the physical space while the hero camera conducted a more tradition capture of visible light. Sensor pod 473 could be used to determine the position and pose of hero camera 471 in real time. Assembly 470 is shown via an exploded view (i.e., the dotted lines show the direction in which the various components of the device have been separated for illustrative purposes, but the actual assembly will place those components in contact). Multiple dimensional pods can also be augments with fiducials such as visual tag 403 or any of the other active or passive fiducials mentioned above such as LEDs 404.

The pods of the IGCS can be designed to accept different combinations of sensors and projectors and place them in varying configurations. The resulting modularity of both the types of elements in the arrays and the relative positioning of those elements in those arrays provides numerous benefits as will be described below. The elements of the array can each include a control board, an active element, and a board holder. The active element can be an image sensor or camera having a specific set of optical properties. The active element can be selected from a library of active elements that are designed to operate with the same board holder with the same layout and same mechanical setup. The library of active elements includes cameras specific to certain limited color spectra of visible light, black and white capture, polarization, infrared, ultraviolet, etc. The library can also include active elements that are projectors such as surface texture projectors, IR projectors, or any other form of projector mentioned herein.

Figure 5:
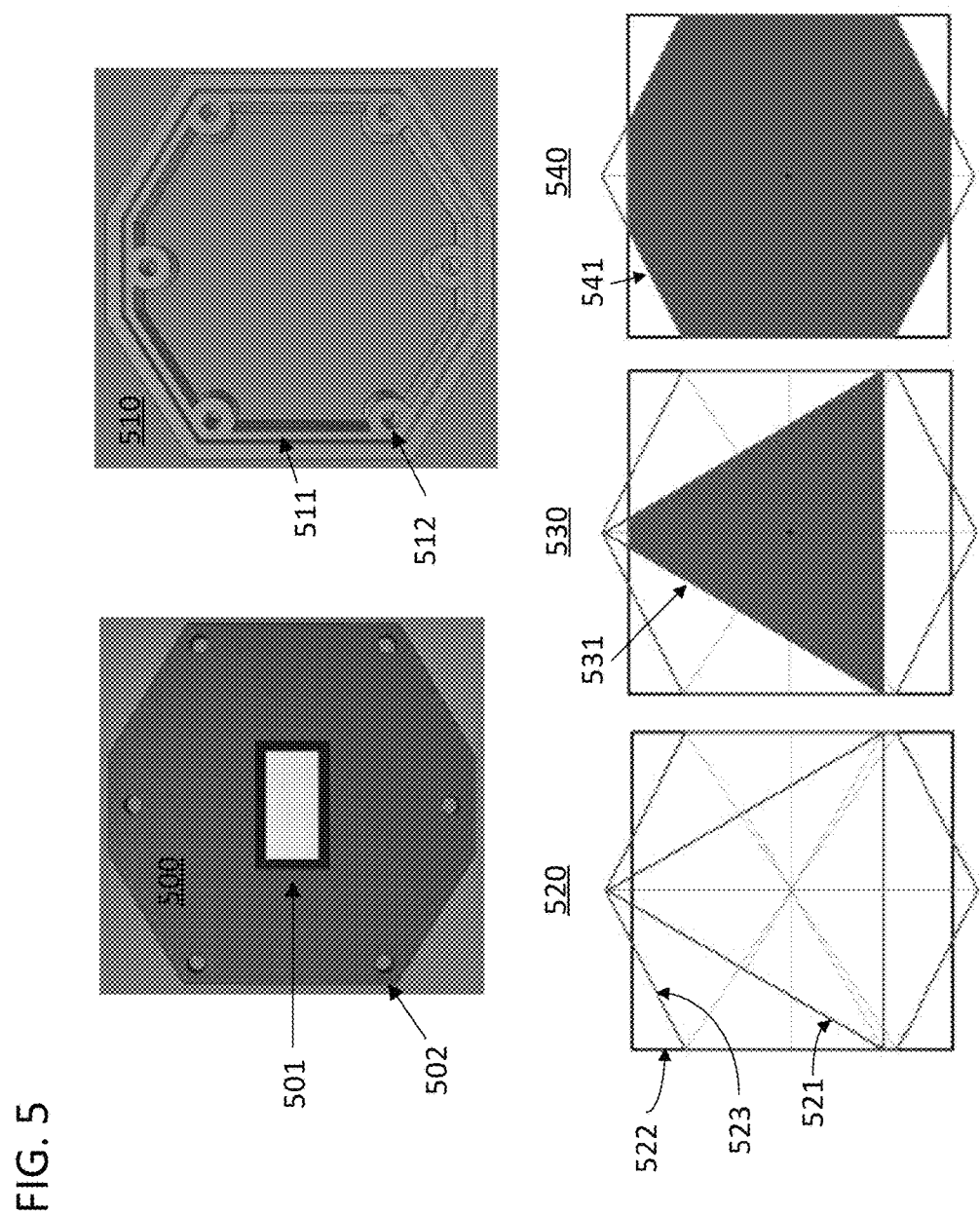
FIG. 5 is an illustration of a pod board and board holder along with diagrams for the selection of board profiles in accordance with certain approaches in this disclosure.

FIG. 5 illustrates an example board 500 and board holder 510 from a top down perspective. The board can be a shaped printed circuit board with active element 501 located at the center of the board. Active element 501 can be connected to board 500 via a compression connector. The board can include mounting holes 502 that are positioned to align with pegs or corresponding mounting holes on a board holder. In the illustrated example, the six mounting holes from board 500 are configured to align with six mounting holes 512 on board holder 510. Board holder 510 includes a sunk groove 511 into which the board is placed. The profile of the board and board holder is an irregular octagon, and belongs to a specific class of shapes that exhibit certain benefits for application to an array of cameras for an IGCS as will be described below. Board holder 510 could be machined aluminum or some other electrically and thermally conductive material in order to provide thermal dissipation and electromagnetic shielding to board 500 and active element 501.

Supporting electronics and mechanical features on the board can make various aspects of the sensor locally accessible and controllable. For example, each sensor could provide controls for manual shutter speed, manual gain, manual white balance and shutter synchronization. The board could also provide signals for strobe, lens iris control, lens focus control, and lens zoom control. Any filters present on the sensor could be attachable to the board, and any tunable filters could receive controls generated at the board level.

The elements of the pod array can be arranged at different regular tilings (e.g., triangular, square, hexagonal etc.). Since the elements can be arranged at different regular tilings, the relative positioning of the elements of the arrays can be adjusted to improve the performance of different sensor arrays as set to different purposes. As will be described below, different tilings are more conducive to certain kinds of data capture. The shape of each element in a pod array, as set by the profile of the board and board holders, can be set equal to the intersection of two or more overlapping concentric dissimilar polygons. For example, the elements can be shaped by the intersection of a hexagon with a corresponding concentric rectangle, or the intersection of both of those elements with a corresponding concentric triangle. In specific approaches, the overlapping polygons can have the same width or horizontal scale with respect to the layout of the array. Arrays that exhibit this feature exhibit the beneficial feature of accommodating human stereopsis as the resulting regular tilings that accommodate elements with such profiles will still capture data with common horizontal sampling.

Returning to FIG. 5, the irregular octagonal profile of board holder 510 belongs to the class of shapes described in the previous paragraph. Stack 520 shows the intersection of a concentric equilateral triangle 521, square 522, and regular hexagon 523, all with the same horizontal scale. The three shapes have the same width when considered with respect to the layout of the arrays to which they will be applied. A pod array for an IGCS could beneficially exhibit elements having a profile defined by the intersection of all three shapes 531 in stack 530 or the intersection of the hexagon and square 541 in stack 540. Different polygons can be applied to produce other variations. The larger the number of polygons selected, the more potential tilings will be available for the modular pod arrays. However, increasing the number of polygons decreases the space available for the board electronics. A comparison of shapes 531 and 541 proves this out. Although elements with shape 531 will can be tiled in accordance with rectangular, triangular, or hexagonal regular tilings, and shape 541 can only be tilted in accordance with rectangular or hexagonal tilings, shape 541 has more area to include the active element 501 and any supporting electronics that will be placed on board 500.

Pod arrays of elements that are formed by the intersection of two or more overlapping concentric dissimilar polygons can be packed into different tilings. FIG. 6 provides an example of how a single element, having a profile in accordance with the aforementioned characteristic, can be used to allow for modular array tiling. FIG. 6 illustrates two pod frames 600 and 601. Both pod frames utilize the same primary element, which is equivalent to the shape of board holder 510. The two frames are indeed sets of board holders that have been machined together from a single work piece. In this case, the work piece was a single piece of aluminum. Such a frame exhibits certain benefits in that the location of each individual elements on a common plane is helpful for many computer vision techniques. Frame 600 has a square tiling configuration with 21 sensors. Frame 601 has a hexagonal tiling with 19 sensors. Both frames are made of the same basic unit, but are arranged differently. Therefore, boards designed to have a profile in accordance with shape 541 can be placed in both a hexagonal and rectangular tilings by simply removing them from one frame and placing them in another. Different frames could then be selected to house different collections of sensors and projectors according to a specific application required of one of the pods in the IGCS. Also, both arrays have the same horizontal spacing between sensors to make the capture amenable to human stereopsis regardless of which tiling is utilized.

Figure 7:
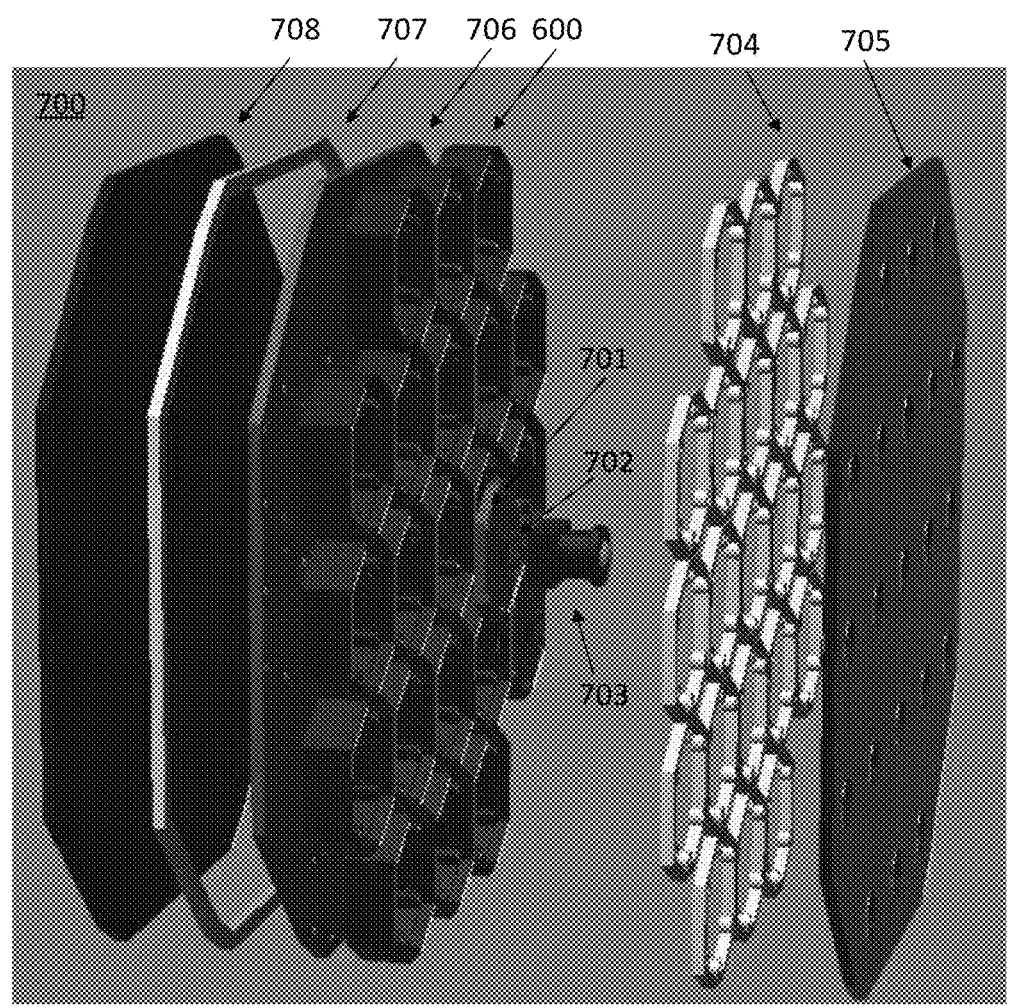
FIG. 7 is an exploded side view of a pod assembly in accordance with certain approaches in this disclosure.

FIG. 7 provides an illustration of the entire assembly of a pod using the style of frame described with reference to FIG. 6. Pod 700 is shown in an exploded view expanded out in a horizontal direction across the page. The elements have been separated, and only a single board 701 is shown for clarity. When assembled, all the illustrated elements would be collapsed down and lie directly in contact as shown, and each board holder would be occupied by a board. Board 701 includes active element 702. In this case, the active element 702 is an image sensor and is augmented with a lens 703. The remaining spaces provided by frame 600 would be filled by any modularly selected set of sensors or projectors. Board 701 could be attached to a frame such as aluminum frame 600. The frame could include connector holes that line up with the holds on the board. The connector holes could also line up with connector holes on a gasket 704 that is configured to seal the array and prevent short circuits.

The subassembly of boards attached to frame 600 could be sheathed in additional layers to provide structural support, electrical isolation, and other features. As illustrated, frame 600 could be covered by a cover 705 to seal the pod and provide structural support. Cover 705 could also be aluminum, or some other conductive material, in order to provide electromagnetic shielding. Frame 600 could be attached to a motherboard, such as motherboard 706, which could be a printed circuit board. The motherboard could include supporting electronics, and control and synchronization logic that was common to the entire array. Motherboard 706 could include power regulator circuitry, batteries, processors, and memory. A second cover 708 could seal the pod and provide structural support. Cover 708 could also be conductive material in order to provide electromagnetic shielding. Cover 708 could be separated from motherboard 706 by a gasket 707 to help seal the device and prevent short circuits. The pod can also be sheathed in aluminum side walls wrapping the pod in a direction defined by the perimeter of the array to create Faraday electromagnetic shielding for the board array. The resulting assembly would provide a mechanical arrangement that is robust, protects the electronics from dust, moisture, and electromagnetic interference, and can dissipate heat efficiently. The entire assembly could be placed on a tripod base or other rig. The tripod or rig could attach to a holder built onto the assembly that could include a vibration reducing materials such as Sorbothane.

The sets of sensors in the pods can be tiled and selected to serve specific purposes. In particular, the set of sensors can be densely packed and aligned sensors organized into different subsets where the subsets are tiled according to varying tilings and patterns. The subsets of sensors can share a common capture modality, but each capture a different characteristic of that modality. The different characteristics can be referred to as variants. These types of pods can be referred to as hybrid sensor pods. Specific tiling patterns can be utilized to support different capture modalities and variants. The patterns can include k-coloring in which the tiles of a grid are such that no more than k color are used and no adjacent sensors around a common vertex are of the same type. The modalities can be: visible light capture, geometry capture, surface capture, lighting source identification, IR light capture, and other sensor capture modalities relevant to an IGCS. The modalities can vary according to one of more of the following characteristics: color resolution, data resolution, polarization, capture speed, light spectrum, and field of view. The sensors can be aligned in accordance with the pod array disclosure above provided with reference to FIGS. 5-7. In particular, alignment can be provided via the production of a common frame from a single work piece as in the production of frame 600.

Figure 8:
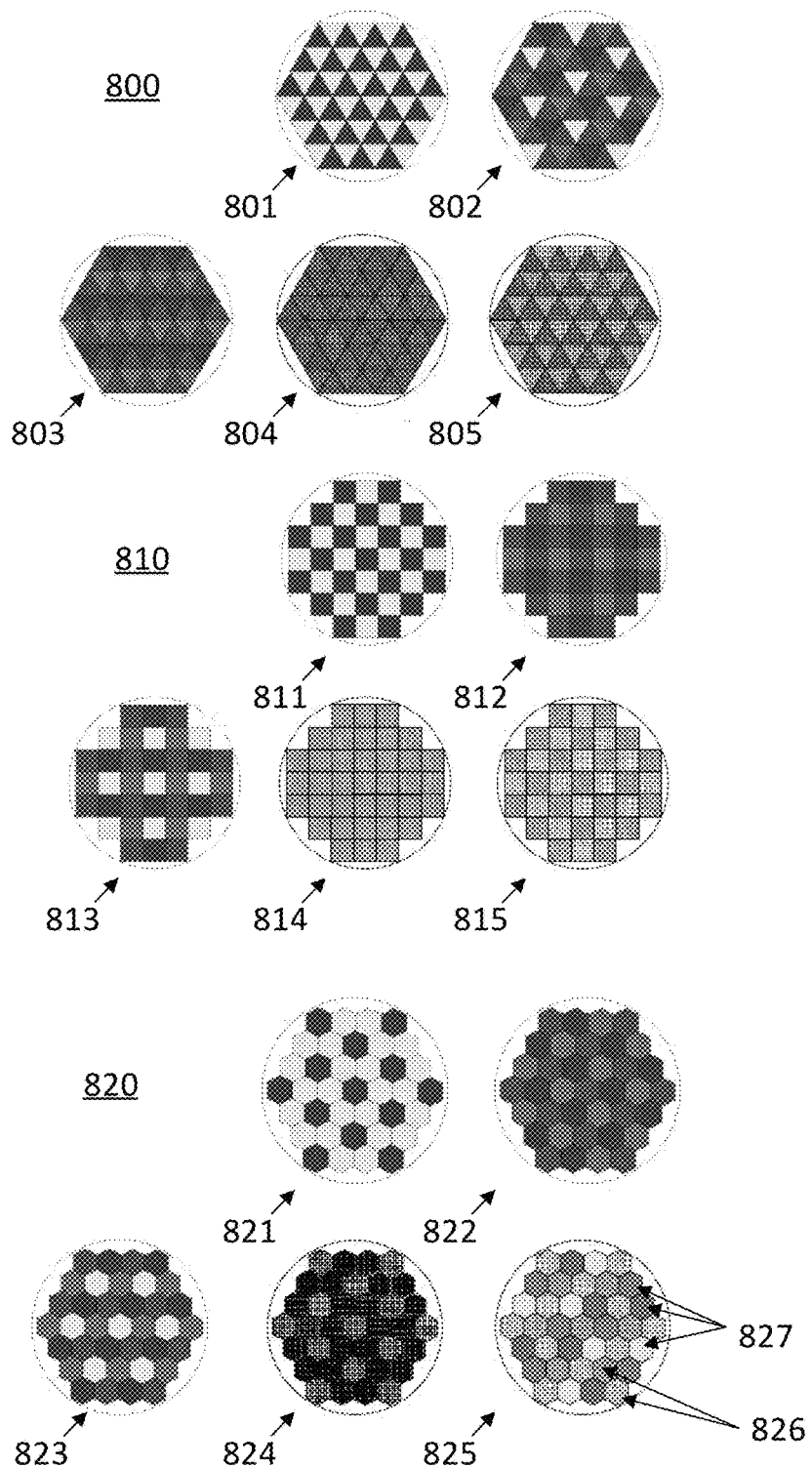
FIG. 8 is an illustration of various triangular, square, and hexagonal tiling patterns for pod arrays in accordance with certain approaches in this disclosure.

FIG. 8 provides an example of different patterns for a triangular tiling 800, a square tiling 810, and a hexagonal tiling 820. The triangular tiling shown in 800 can be achieved through the use of a board in accordance with profile 531. Patterns 801, 802, and 803 illustrate a 121212 uniform, 121314 uniform, and 3-coloring pattern respectively. These patterns would be able to support densely packed arrays of single capture modalities with 2, 4, and 3 variants respectively. For example, and as illustrated by patterns 804 and 805, the 121212 tiling patterns could support a densely packed array of visible light sensors that varied according to two different light polarizations (pattern 804) and capture speeds (805). The square tiling shown in 810 can be achieved through the use of a board with a profile that is in accordance with either profile 531 or 541. Patterns 811, 812, and 813 illustrate a 1212 uniform, 1213 uniform, and 1234 uniform coloring. These patterns would be able to support densely packed arrays of single capture modalities with 2, 3, and 4 variants respectively. For example, and as illustrated by patterns 814 and 815, the 1212 tiling pattern could support a densely packed array of visible light sensors that varied according to two different light polarizations (pattern 814) and capture speeds (815). The hexagonal tiling shown in 820 can be achieved through the use of a board with a profile that is in accordance with either profile 531 or 541. Patterns 821, 822, and 823 illustrate a 112 uniform, 123 uniform, and 4-coloring pattern respectively. These patterns would be able to support densely packed arrays of single capture modalities with 2, 3, and 4 variants respectively. For example, and as illustrated by pattern 821, the 112 tiling pattern could support a densely packed array that varied according to polarization.

As mentioned previously, the variants within a hybrid sensor array can vary according to multiple characteristics. For example, patterns 805, 815, and 824 could also be used for a particular hybrid array in which the two subsets of sensors varied not only according to capture speed but also according to polarization. Pattern 805, 815 and 824 could comprise two subsets of cameras that interlace high speed black and white cameras with regular speed high resolution color cameras to create a hybrid camera that provides strong priors (in the form of edge map and greyscale values) to assist with view-interpolation of the high-resolution color camera. A B/W camera that is half the resolution of a color camera is more than 10× more light efficient if the color camera has the same sensor size and lens (4× larger pixel size and 3× wider spectral bandwidth), and thus can capture images 10× faster with the same signal to noise ratio as the color camera. As another example, pattern 825 could combine speed variants and spectrum variants. The hybrid array includes speed variants 826, and also includes multispectral coverage via visible light spectrum variants 827. Pattern 825 therefore differs from patterns 805 and 815 as described in the previous example because, instead of having two subsets of sensors that differ from each other in accordance with two different characteristics, pattern 825 includes two sets of subsets where the subsets in each set vary in accordance with one characteristic.

Figure 9:
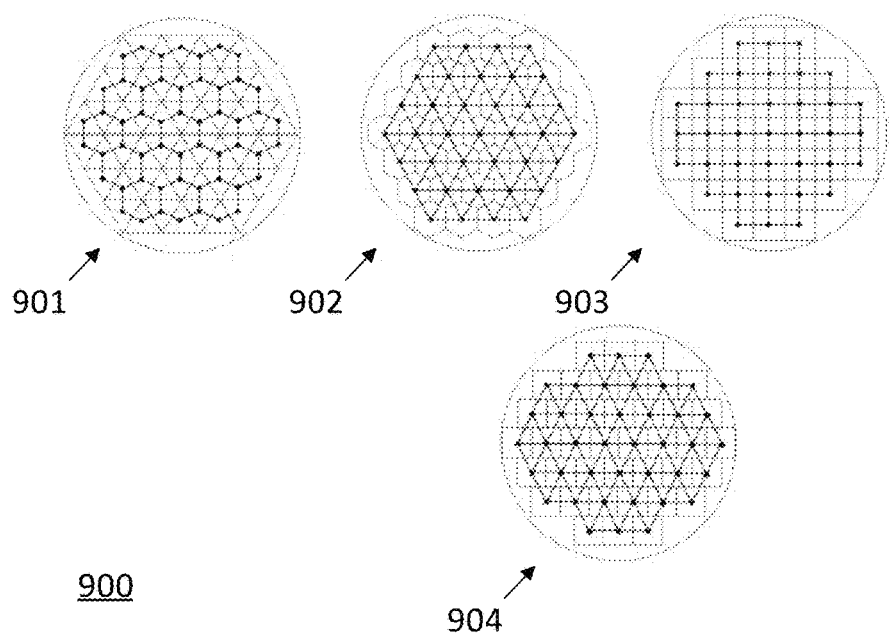
FIG. 9 is an illustration of the dual graph tilings for pod arrays in accordance with certain approaches in this disclosure.

FIG. 9 illustrates a set of dual graphs 900 for some of the tilings that can be used for pod arrays. Dual graph 901 illustrates how the dual graph of triangular tiling is hexagonal. Dual graph 902 illustrates how the dual graph of the hexagonal tiling is triangular. Dual graph 903 illustrates how the dual graph of the square tiling is square as well. Dual graph 904 is for a shifted square tiling, and has a dual graph that comprises non-equilateral triangles. As seen with reference to dual graphs 904 and 902, in terms of the inter-cell spacing, a shifted square tiling can be considered roughly approximate to hexagonal tiling. Therefore, patterns of sensor variants or manufacturing processes that are only amendable to square tiling can still be applied to an array with approximately hexagonal dual graph inter-cell spacing using a shifted square tiling. Human vision can fuse stereo information from a fairly limited disparity of angles after vergence. The dual graphs also illustrated how triangular tiling is not aligned in the horizontal dimensions and not equispaced in the vertical direction, but is aligned if every other camera is skipped. Therefore, combining a hexagonal dual graph array with a pattern that distributes variants as shown above in 801 and 803-805 provide certain benefits when applied to form images for reproduction to a human eye. The dual graphs also show how hexagonal tiling is aligned and equispaced in the horizontal direction, but not in the vertical direction unless every other sensor is skipped. However, as mentioned previously, hexagonal tiling does provide the benefit of having the center of each sensor equispaced to all of its adjacent sensors. The dual graphs also show how square tiling is the most beneficial in this regard as it is aligned and equispaced in both axes which provides certain benefits when applied to any variant pattern with a set period of repetition.

Another set of specialized pods includes those that are directed towards capturing data concerning the lighting and environment of a physical space or scene. As mentioned previously, in addition to capturing the geometry of a physical space or scene, an IGCS may capture the lighting and environment of that physical space or scene. The data collected by these specialized sensors could be used to identify the particular location and properties of directed light sources in the scene. The particular location could be determined within the common coordinate frame of the IGCS. The computation needed to make these determinations could be conducted by processors on the pod itself to decrease the amount of data that would need to be transmitted from the direction of light pod. The data collected by these specialized sensors could also be used to identify the ambient lighting of the scene. Once obtained, the data could then be used to enable relighting of a scene, or to make the model of the captured physical space fully modifiable via the addition of graphic objects into the physical space to be rendered with correct lighting and shadow. In addition, the information could be used to allow for the removal of items from the physical space while automatically adjusting for the change in lighting conditions as to shadows and new lighting that would result from their absence.

Figure 10:
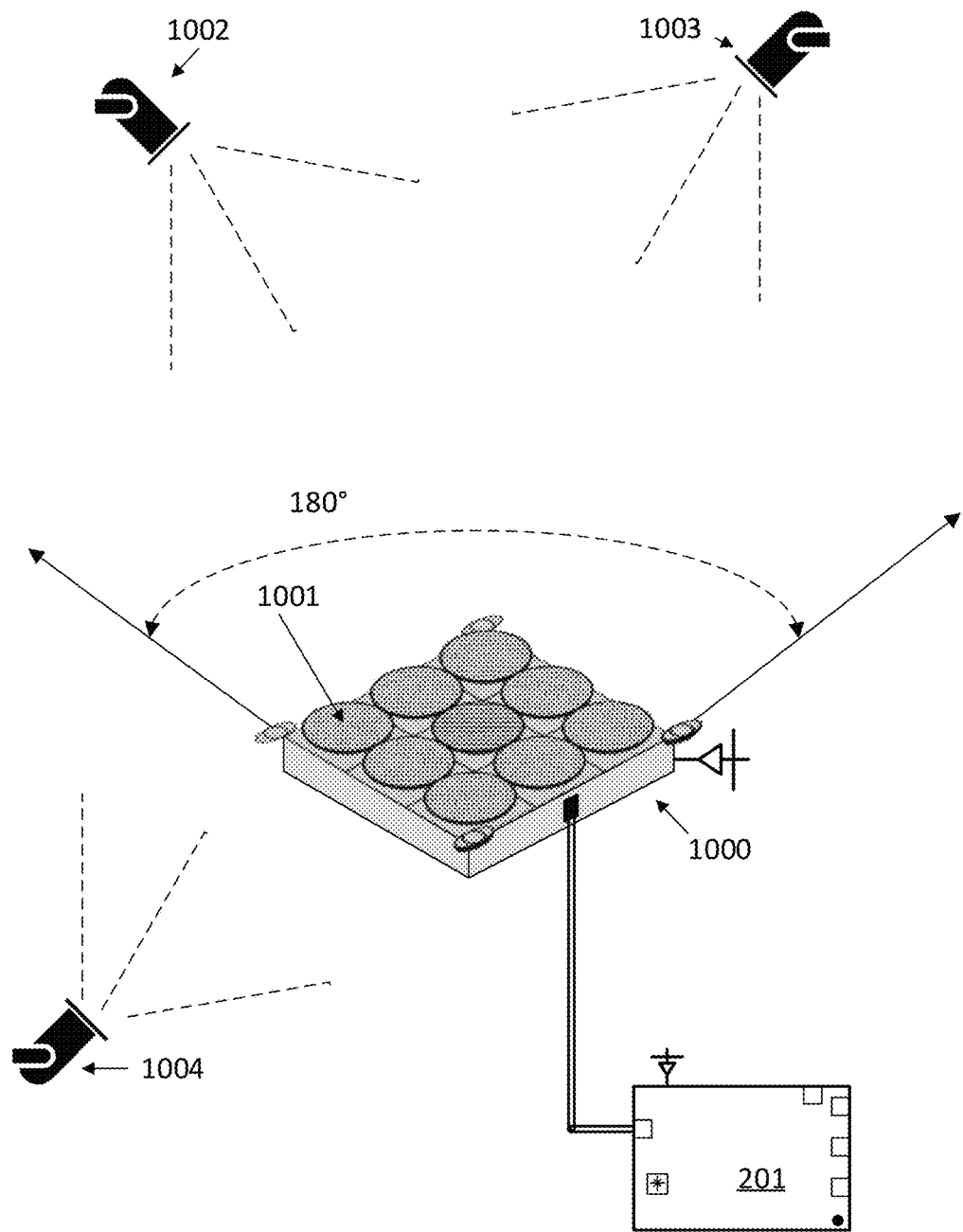
FIG. 10 is a functional diagram of a light detection pod assembly in accordance with certain approaches in this disclosure.

FIG. 10 illustrates an example lighting detector pod 1000. The lighting detector pod could be configured so that it sits looking up or out at the lighting in the scene. For example, the lighting detector pod could be configured for placement on the floor, or other horizontal surface, of the physical space. Like other pods, the pod can have a wired or wireless connection to a synchronization box 201. The pod can also include its own localized calibration and control board, active or passive fiducials to allow other sensors in the system to determine its location, and any of the other features described with reference to the other pods disclosed above.

Pod 1000 includes a set of specialized sensors. The sensors have ultrawide angle lenses 1001 and can be configured for high dynamic range. The sensors could also have various filters to screen for different kinds of light, different polarizations, and different colors of visible light. The filters could vary from element to element in lighting detector pod 1000 such that multiple characteristics of the light were measured at the same time. Lighting detector pod 1000 is also designed so that it has a 180° field of view of the scene. The set of sensors in the lighting detector pod could include at least two cameras with ultrawide fields of view such that they can obtain the data necessary to identify the depth of any lighting source in that 180° field of view. Although such a collection of sensors would not be an optimal configuration for determining the geometry and coloring of a scene, it would be very effective at determining the location and characteristics of light 1002 and 1003. In other approaches, the lighting detector pod could have a three-dimensional array of sensors and be configured to detect light from greater than 180°.

In addition to detecting directed lights in its field of view, a lighting detector pod could be configured to detect general ambient lighting information and environment information. Pod 1000 could be used to determine an ambient lighting condition caused by lights outside of its field of view, and potentially outside the field of view of all sensors in the IGCS, such as from light 1004. Pod 1000 could be also configured as an environmental sensor such that it could obtain data used to determine the characteristics and location of light 1004 even though the light is not in the sensors field of view.

As with the sensors and projectors of the IGCS generally, the lighting detector pods could be mobile and can be augmented with additional sensors or fiducials in order for the IGCS to keep track of the location and pose of the lighting detector pod with respect to a common coordinate frame of the IGCS. For example, a lighting detector pod used to capture a scene with a common coordinate frame that was translating with respect to a fixed position on Earth, such as a car chase scene, could include an IMU to track its specific location as the scene was captured.

The IGCS can also include a specialized sensor, or sensors, for capturing data that describes the how a surface interacts with light from different perspectives. If the model captured by the IGCS is to be both photorealistic and modifiable, such information concerning the surfaces in the physical space should be captured. Although this aspect of photorealism is not intuitive, its absence is immediately apparent, as it creates a "synthetic" appearance in which the reflectivity, scattering, and micro-texture shading of a surface do not change based on the angle you are observing it from. The surface sensor can be a specialized rig of moving lights and cameras to capture the lightning response of a given surface designed to capture the bidirectional distribution functions (BxDF) of the surface. For example, the sensor could collect information for capturing the BRDF of the surface.

To capture the BxDF of a surface, a surface scanner in the IGCS will need to know not only how the surface responds to light from different angles, but also how it responds to different wavelengths of light from those angles. The number of measurements that must be taken is therefore large, and as such the surface scanner may be configured to operate independently of the remainder of the IGCS and obtain information concerning the characteristics of a surface for storage in parallel with the remainder of the data obtained by the IGCS. That data can then be recalled for use at a later time when needed by other components of the IGCS or in post processing.

Figure 11:
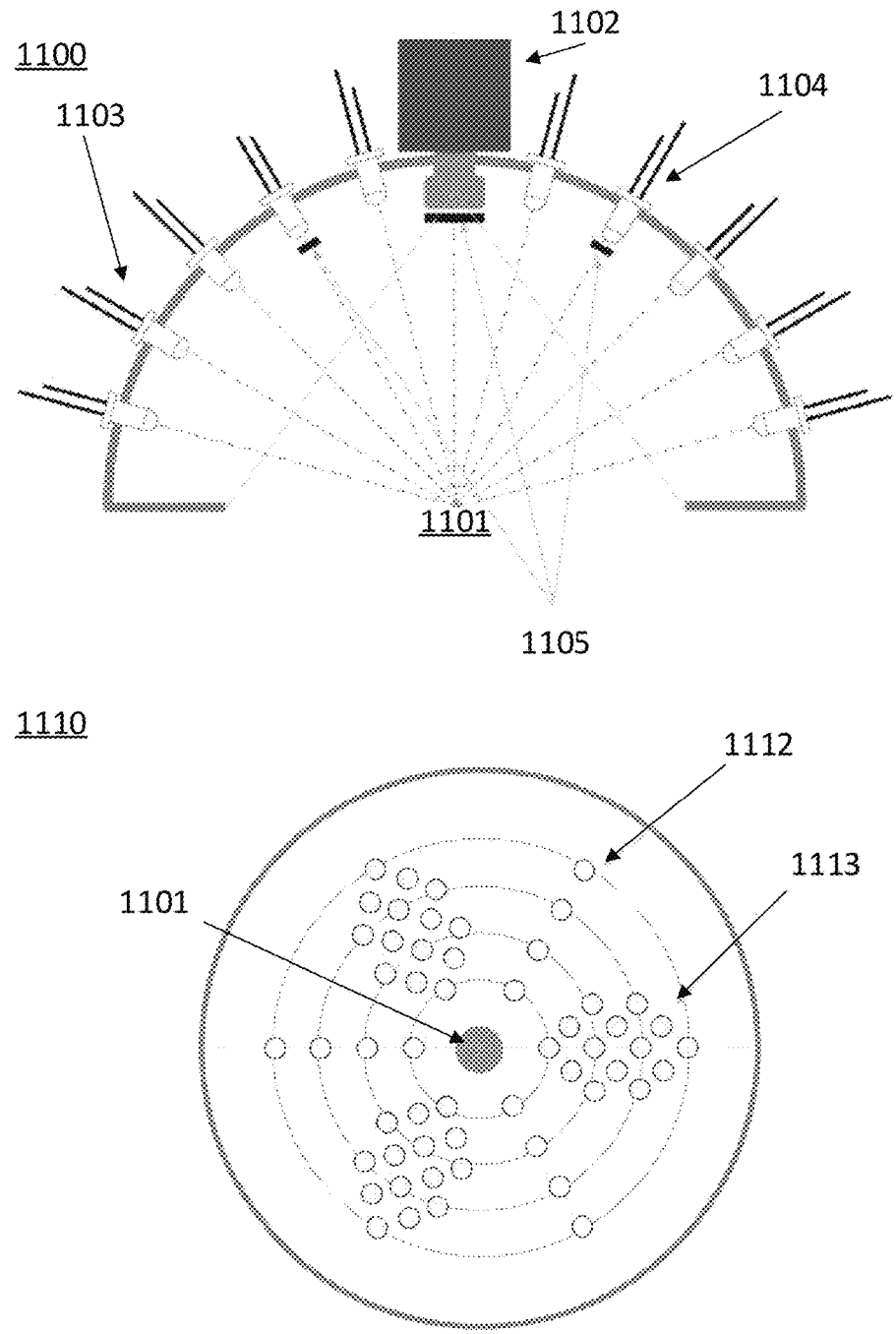
FIG. 11 is a functional diagram of a surface scanner in accordance with certain approaches in this disclosure.

FIG. 11 provides a cross sectional 1100 and top down 1110 view of a potential configuration for a compact on-site surface scanner for an IGCS. The surface scanner is configured to scan a surface located at a center point of the scanner 1101. A camera 1102 is situated to observe the surface and measure its response to a bombardment of different patterns of light. The arch of the surface scanner can be populated with light sources 1104 and photosensitive elements 1103. The light sources could be LEDs, phototransistors, or some other form of light generating device. The light sources could be configured to produce light of a specific wavelength or polarization. Different groups of light sources could then be configured to activate at different times to take different measurements. The photosensitive elements can likewise be LEDs, phototransistors, or some other form of light sensitive device. The photosensitive elements could be configured to sense light of different wavelengths or polarizations. The surface scanner can also include cross polarizers for photometric stereo 1105 outside the plane of cross section 1110. Top down view shows a potential distribution for LEDs for light generation 1112 and photosensitive elements 1113 to capture specular and diffused lobes of the BxDF at several angles.

Figure 12:
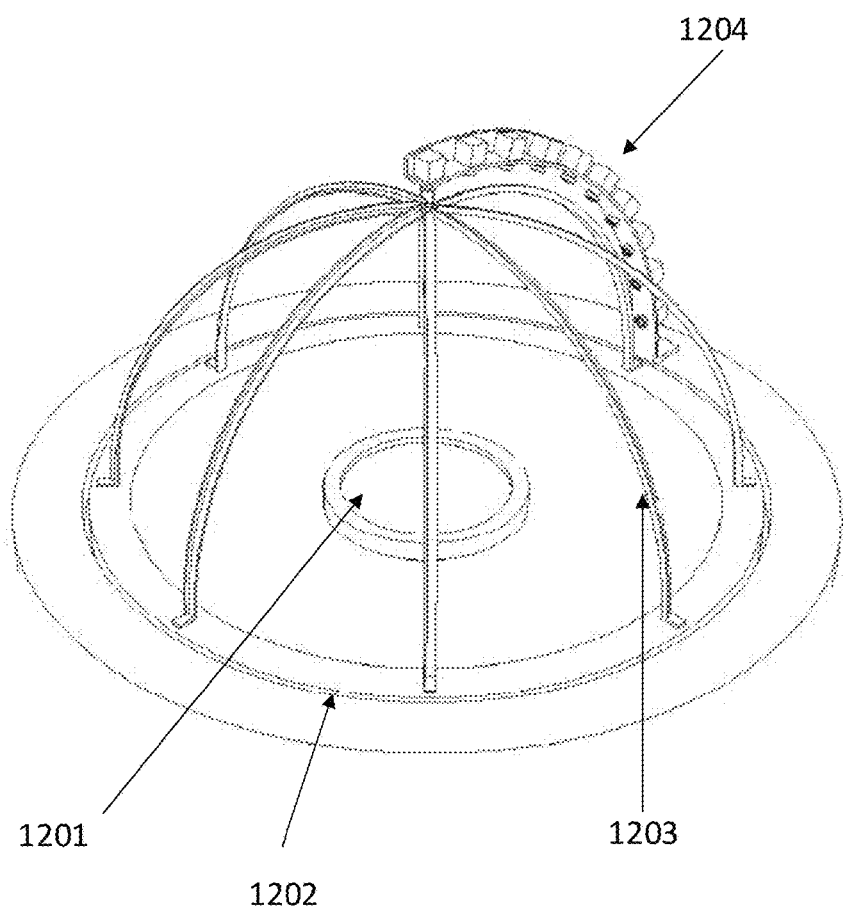
FIG. 12 is an illustration of a surface scanner in accordance with certain approaches in this disclosure.

FIG. 12 provides an isometric view of a potential configuration for a high-resolution surface scanner for an IGCS. The high-resolution surface scanner could be located off-site in a separate lab from the rest of the equipment used in an IGCS. Surface scanner 1200 includes a tray 1201 on which an item can be placed. The item can be a sample of a surface for the scanner. Surface scanner 1200 also includes a rig support ring 1202, light generation arms 1203, and a sensor array arm 1204. Light can be generated from LEDs placed on the inside edge of light generation arms 1203. The light can be generated at various intensities and spectra while sensor array arm 1204 obtains measurements for the BxDF. Furthermore, either tray 1201, support ring 1202, or sensor array arm 1204 may be independently rotatable to allow for the sensor array arm 1204 to obtain BxDF component values for all potential angles of reflection (in this example, the tray 1202 and the support ring 1202 are rotating while the sensor array arm 1204 is fixed).

The IGCS may also include trackable fixed or mobile projectors in sync and under control of the IGCS for purposes of executing projection mapping, scene lighting, or for introducing patterns or codes onto the scene that can be detected by other sensors in the IGCS. As used herein, the term projection mapping refers to using knowledge of a three-dimensional surface (obtained via a three-dimensional model, control algorithm, or three-dimensional camera) to project light onto a real surface in a physical space. The light can be used to produce a three-dimensional image that is perceptible to the unaided human eye. The light can also be used to produce IR textures that are perceptible to other sensors in the IGCS. With such projectors, the IGCS could not only capture the geometry, lighting and surface properties of a scene, but could also project patterns back onto the scene for detection by a human eye or for transferring information to other sensors in the IGCS. The projectors could be active RGB projectors, IR projectors, or projectors for any spectrum. The projectors may be in a fixed and static configuration or may be mobile with active and passive labels. The projectors could be augmented with built in pods, IMUs, or other sensors used to track the projector's motion and aid in conducting highly accurate SLAM. The projectors could also be augmented with calibration and control boards so that they are synchronized with the other elements in the IGCS.

Figure 13:
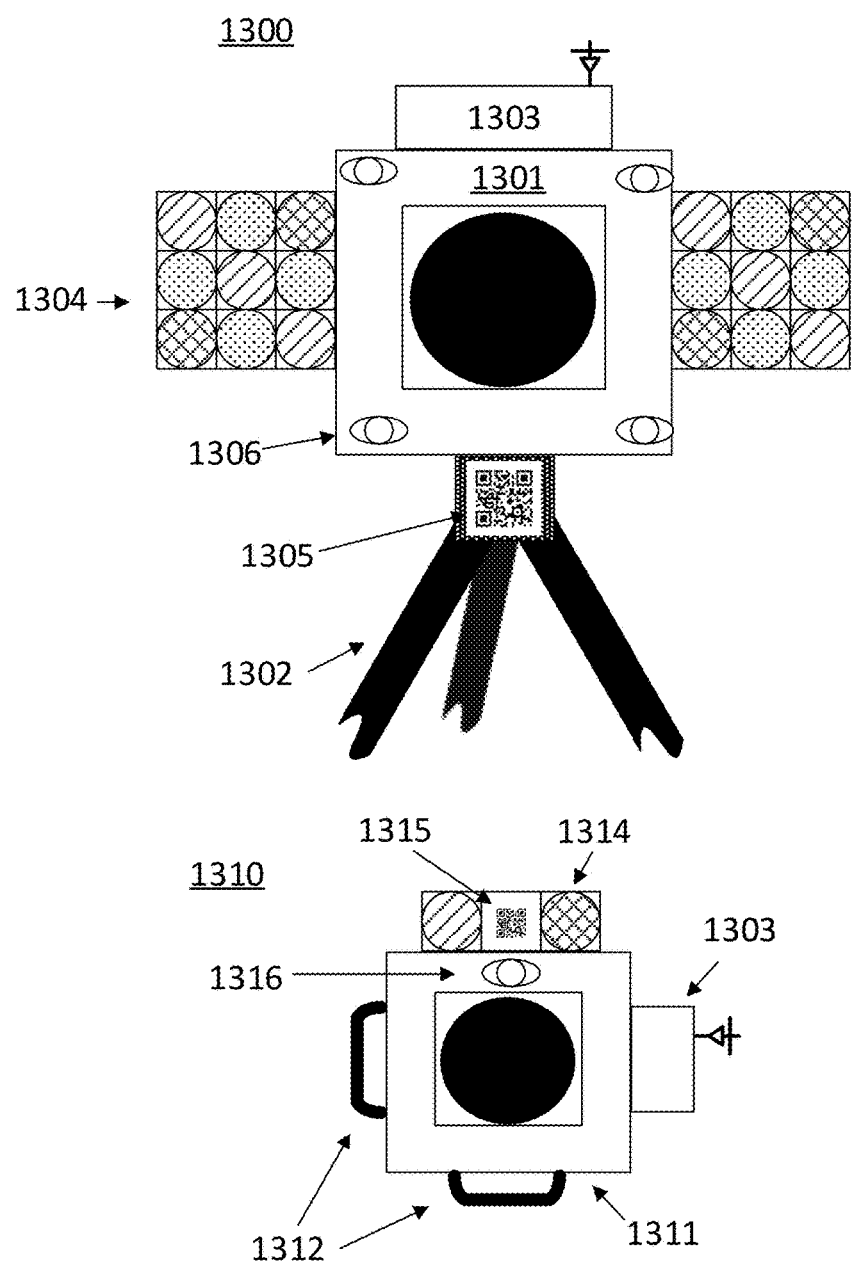
FIG. 13 is a block diagram of a fixed projector and a mobile projector in accordance with certain approaches in this disclosure

FIG. 13 is a block diagram of two projectors for an IGCS that can be used for projection mapping in a physical space. Fixed projector 1300 includes a projector unit 1301 and is attached to a tripod base 1302. Mobile projector 1310 includes a projector unit 1311 that is slightly smaller than projector unit 1301 and includes handles 1312 so that the projector can be moved around the physical space. Both sensors also include an attached calibration and control board 1303 that can receive commands, transmit data, and receive synchronization control signals for the projector. The control boards could also be in communication with attached IMUs or other sensors that would allow the projector to determine its own position. As illustrated, the projectors are also augmented with pods 1304 and 1314. The pods can be used to assist in SLAM for the projectors or to generate any other data needed for the feedback control loop associated with projection mapping. The projectors can also be augmented with markers to assist the IGCS in determining their pose and identity such as tags 1305 and 1315 or LEDS 1306 and 1316.

The IGCS, with all of its myriad sensors, will produce a large amount of data during a capture. The data can be uploaded from the sensors to a network and stored at a remote data center in real time. However, in some cases, there might be too much data generated to transmit off site in an efficient manner. Therefore, the IGCS can be augmented with compact, shock resistant, shippable data cases. The data cases could be easy to carry to and from the cite. The data cases could be roughly the size of a large suit case. The suitcases could be directly shippable by a standard mail carry to offline cloud storage data centers. The data cases could include built in I/O capabilities via wired or wireless connections. The data cases could also include onboard processors to conduct preprocessing of the obtained data to being the processes of obtaining a workable model from the raw data obtained by the IGCS's sensors. The degree of computation conducted would decrease the flexibility available to downstream processors and would require additional intelligence on the data case, but could also greatly alleviate the data requirements of the overall system. The data case could be configured to be rugged and drop resistance and it could also contain a shipping label area built into its surface. The data cases could also optionally have a master synchronization and control system built in (i.e., the synchronization box 101 and data case 111 of FIG. 1 would be the same physical device).

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Modifications and variations to the present invention may be practiced by those skilled in the art, without departing from the scope of the present invention, which is more particularly set forth in the appended claims.

What is claimed is:

1. An inverse graphics capture system comprising:
a synchronization board, wherein the synchronization board generates a trigger signal;
a first sensor pod having a single machined frame, wherein the single machined frame includes a set of board holders machined together from a single work piece; and
a first set of sensors located on a set of boards, wherein the set of boards are placed in the set of board holders;
a first sensor in the first set of sensors and attached to a first calibration board, wherein the first calibration board receives the trigger signal and generates a first capture signal by adding a first temporal offset to the trigger signal; and
a second sensor attached to a second calibration board, wherein the second calibration board receives the trigger signal and generates a second capture signal by adding a second temporal offset to the trigger signal;
wherein the first sensor begins capturing a first frame of a scene at a first time set by the first capture signal;
wherein the second sensor begins capturing a second frame of the scene at a second time set by the second capture signal;
wherein the synchronization board sets the first temporal offset and the second temporal offset to minimize a difference between the first time and the second time;
wherein a capture using the first sensor pod is amenable to human stereopsis as: (i) every sensor in the first set of sensors is located on a common plane; and (ii) the first set of sensors is equispaced along at least one dimension of the single machined frame;
wherein the first set of sensors are modular;
wherein each cell in a set of cells of the first sensor pod is: (i) defined by an intersection of the outlines of at least two concentric dissimilar polygons; and (ii) includes a sensor in the first set of sensors, a board in the set of boards, and a board holder in the set of board holders;
wherein the at least two concentric dissimilar polygons have equal widths; and wherein the at least two concentric dissimilar polygons include a hexagon and a square.

2. The inverse graphics capture system of claim 1, further comprising:
a synchronization array; and
set of lights in the synchronization array, wherein each light in the set of lights defines at least one state of the set of lights by being active or dormant, and wherein each state of the set of lights uniquely corresponds with a code;
wherein the first sensor captures a first image of the set of lights in a first state;
wherein the second sensor captures a second image of the set of lights in a second state; and
wherein the inverse graphics capture system sets the first temporal offset and the second temporal offset based on a comparison of a first code expressed by the first state with a second code expressed by the second state.

3. The inverse graphics capture system of claim 1, further comprising:
a second sensor pod, wherein the second sensor is one of a second set of sensors in the second sensor pod;
wherein the second set of sensors are modular; and
wherein each cell in a set of cells of the second sensor pod is: (i) defined by the outline of the intersection of the at least two concentric dissimilar polygons; and (ii) includes a sensor in the second set of sensors.

4. The inverse graphics capture system of claim 3, wherein the first sensor pod comprises:
a single machined frame, wherein the single machined frame includes a set of board holders;
a set of conductive sidewalls;
a cover of conductive material; and
a second cover of conductive material;
wherein the set of conductive sidewalls, the cover, and the second cover, form Faraday shielding for the set of cells of the first sensor pod; and
wherein each cell of the set of cells includes a board connected to a board holder in the set of board holders.

5. The inverse graphics capture system of claim 1, further comprising:
a third sensor in the first set of sensors;
wherein the first sensor and the third sensor are both sensors for a common capture modality but have a different characteristic for that common capture modality.

6. The inverse graphics capture system of claim 5, wherein the different characteristic is selected from the group consisting of: a different polarization, a different capture speed, and a different field of view.

7. The inverse graphics capture system of claim 5, wherein:
the different characteristic is a difference in both capture speed and light spectrum;
the first sensor is in a first subset of sensors in the first set of sensors;
the first subset of sensors are black and white cameras;
the third sensor is in a second subset of sensors in the first set of sensors;
the second subset of sensors are color cameras;
the black and white cameras have higher capture speeds than the color cameras; and
the first subset and the second subset are distributed across the first set of sensors in accordance with a 2-coloring tiling.

8. The inverse graphics capture system of claim 1, further comprising:
a second sensor pod, wherein the second sensor is one of a second set of sensors in the second sensor pod;
an environment sensor pod having a set of at least three ultrawide angle color cameras; and
a third calibration board attached to a first of the at least three ultrawide angle color cameras, wherein the third calibration board receives the trigger signal and generates a third capture signal by adding a third temporal offset to the trigger signal;
wherein a first of the set of at least three ultrawide angle color cameras begins capturing a third frame of the scene at a third time;
wherein the set of at least three ultrawide angle color cameras have a high dynamic range; and
wherein the synchronization board controls a feedback loop to minimize an offset between the first time and the third time by adjusting the third temporal offset.

9. The inverse graphics capture system of claim 1, further comprising:
a projector attached to a third calibration board, wherein the third calibration board receives the trigger signal and generates a start projection signal by adding a third temporal offset to the trigger signal;
wherein the projector begins projecting information onto the scene at a third time set by the start projection signal; and
wherein the synchronization board sets the third temporal offset to minimize a difference between the first time and the third time.

10. The inverse graphics capture system of claim 9, wherein:
the projector is an IR projector;
the information is an IR pattern;
the first sensor detects the IR pattern; and
the inverse graphics capture system uses the IR pattern for one of geometry mapping, calibration, and sensor pose detection.

11. An inverse graphics capture system comprising:
a first sensor pod having a single machined frame, wherein the single machined frame includes a set of board holders machined together from a single work piece; and
a first set of sensors located on a set of boards, wherein the set of boards are placed in the set of board holders;
wherein a capture using the first sensor pod is amenable to human stereopsis as: (i) every sensor in the first set of sensors is located on a common plane; and (ii) the first set of sensors is equispaced along at least one dimension of the single machined frame;
wherein the first set of sensors are modular;
wherein each cell in a set of cells of the first sensor pod is: (i) defined by an intersection of the outlines of at least two concentric dissimilar polygons; and (ii) includes a sensor in the first set of sensors, a board in the set of boards, and a board holder in the set of board holders;
wherein the at least two concentric dissimilar polygons have equal widths; and
wherein the at least two concentric dissimilar polygons include a hexagon and a square.

12. The inverse graphics capture system of claim 11, wherein the first sensor pod further comprises:
a set of conductive sidewalls;
a cover of conductive material; and
a second cover of conductive material;

wherein the set of conductive sidewalls, the cover, and the second cover, form Faraday shielding for the set of cells of the first sensor pod.

13. The inverse graphics capture system of claim 11, further comprising:
a second set of sensors located on a second set of boards, wherein the second set of boards are placed in the set of board holders;
wherein the first set of sensors and second set of sensors are intermingled, aligned, and densely packed; and
wherein the first set of sensors and the second set of sensors are both sensors for a common capture modality but have a different characteristic for that common capture modality.

14. The inverse graphics capture system of claim 13, wherein:
the different characteristic is a difference in both capture speed and light spectrum;
the first set of sensors are black and white cameras;
the second set of sensors are color cameras;
the first set of sensors have higher capture speeds than the second set of sensors; and
the first set of sensors and the second set of sensors are distributed across the set of board holders in accordance with a 2-coloring tiling.

15. The inverse graphics capture system of claim 11, further comprising:
an environment sensor pod having a set of at least three ultrawide angle color cameras; and
a data storage device that receives capture information from the environment sensor pod and the first sensor pod;
wherein the set of at least three ultrawide angle color cameras have a high dynamic range; and
wherein the capture information from the environment sensor pod and the capture information from the first sensor pod are stored in the data storage device with reference to a common spatial coordinate frame.

16. The inverse graphics capture system of claim 15, comprising:
a projector having an integrated inertial measurement unit;
wherein the projector projects a pattern using the common spatial coordinate frame; and
wherein the first set of sensors detect the pattern.

17. An inverse graphics capture system comprising:
a first sensor pod having a single machined frame, wherein the single machined frame includes a set of board holders machined together from a single work piece;
a first set of sensors located on a first set of boards, wherein:
the first set of boards are placed in the set of board holders;
a capture using the first sensor pod is amenable to human stereopsis as: (i) every sensor in the first set of sensors is located on a common plane; and (ii) the first set of sensors is equispaced along at least one dimension of the single machined frame;
the first set of sensors are modular;
each cell in a set of cells of the first sensor pod is: (i) defined by an intersection of the outlines of at least two concentric dissimilar polygons; and (ii) includes a sensor in the first set of sensors, a board in the first set of boards, and a board holder in the set of board holders;
the at least two concentric dissimilar polygons have equal widths; and
the at least two concentric dissimilar polygons include a hexagon and a square; and
a second set of sensors located on a second set of boards, wherein the second set of boards are placed in the set of board holders;
wherein the first set of sensors and the second set of sensors are both sensors for a common capture modality but have a different characteristic for that common capture modality.

18. The inverse graphics capture system of claim 17, wherein the first sensor pod further comprises:
a set of conductive sidewalls;
a cover of conductive material; and
a second cover of conductive material;
wherein the set of conductive sidewalls, the cover, and the second cover, form Faraday shielding for the first set of sensors and the second set of sensors.

19. The inverse graphics capture system of claim 17, comprising:
the different characteristic is a difference in both capture speed and light spectrum;
the first set of sensors are black and white cameras;
the second set of sensors are color cameras;
the black and white cameras have higher capture speeds than the color cameras; and
the first set of sensors and the second set of sensors are distributed across the set of board holders in accordance with a 2-coloring tiling.

20. The inverse graphics capture system of claim 17, further comprising:
a second sensor pod; and
a data storage device that receives capture information from the first sensor pod and the second sensor pod;
wherein the capture information from the first sensor pod and the second sensor pod are stored in the data storage device with reference to a common spatial coordinate frame.

21. The inverse graphics capture system of claim 20, comprising:
a projector;
wherein the projector projects a pattern using the common spatial coordinate frame; and
wherein the first set of sensors detect the pattern.

22. The inverse graphics capture system of claim 17, comprising:
an environment sensor pod having a set of at least three ultrawide angle color cameras; and
a data storage device that receives capture information from the environment sensor pod and the first sensor pod;
wherein the set of at least three ultrawide angle color cameras have a high dynamic range; and
wherein the capture information from the environment sensor pod and the capture information from the first sensor pod are stored in the data storage device with reference to a common spatial coordinate frame.

* * * * *

UNITED STATES PATENT AND TRADEMARK OFFICE
CERTIFICATE OF CORRECTION

PATENT NO. : 10,044,922 B1
APPLICATION NO. : 15/643375
DATED : August 7, 2018
INVENTOR(S) : Moshe Benezra et al.

Page 1 of 1

It is certified that error appears in the above-identified patent and that said Letters Patent is hereby corrected as shown below:

On the Title Page

Item (72) Inventorship order should read:
1. Moshe Benezra
2. Gary Bradski
3. Daniel A. Aden
4. Ethan Rublee Signed and Sealed this
Sixteenth Day of October, 2018

Andrei Iancu
*Director of the United States Patent and Trademark Office*